(12) United States Patent
Yehuda et al.

(10) Patent No.: US 7,809,667 B1
(45) Date of Patent: Oct. 5, 2010

(54) RULE-BASED NETWORK RESOURCE COMPLIANCE

(75) Inventors: Hanna Yehuda, Newton, MA (US); Daniel C. Lanzi, Wilton, CT (US); Oran Epelbaum, Tel Aviv (IL); Frank Murphy, Milford, MA (US)

(73) Assignee: EMC Corporation, Hopkinton, MA (US)

(*) Notice: Subject to any disclaimer, the term of this patent is extended or adjusted under 35 U.S.C. 154(b) by 739 days.

(21) Appl. No.: 11/769,499

(22) Filed: Jun. 27, 2007

(51) Int. Cl.
*G06N 5/02* (2006.01)
*G06N 5/04* (2006.01)
*G06F 21/00* (2006.01)

(52) U.S. Cl. .............................. 706/47; 726/1; 726/11
(58) Field of Classification Search ................... 706/47
See application file for complete search history.

(56) References Cited

OTHER PUBLICATIONS

Guttman, Filtering Postures: Local Enforcement for Global Policies, 1997.*
Symantec Corporation, The Role of IT in Achieving Compliance, 2006.*
Burns et al., Automatic Management of Network Security Policy, Telcordia Technologies, Inc., 2001.*
* cited by examiner

*Primary Examiner*—Donald Sparks
*Assistant Examiner*—Nathan H Brown, Jr.
(74) *Attorney, Agent, or Firm*—Chapin IP Law, LLC; Barry W. Chapin, Esq.

(57) ABSTRACT

A compliance manager enables creation of policies and corresponding rules to test compliancy of network resources via evaluation of collected data associated with the network resources. For example, each of one or more rules associated with a respective network compliance policy has a corresponding rule scope definition indicating which portion of collected network resource data to use for verification purposes. Each rule also has a corresponding set of selected compliance conditions. The compliance conditions specify what values the portions of collected resource data as specified by the rule scope definition should be in order to be compliant. During a compliancy check, the compliance manager applies the rule scope definition to the collected data to produce a set of network resource data to be verified. Thereafter, the compliance manager determines compliancy by checking whether the produced set of network resource data matches the corresponding compliance conditions as specified for the rule.

20 Claims, 20 Drawing Sheets

Dashboard | Policies | Templates | Violations | Audit Log | Administration | Logout ?

Policies > Create New Policy

Create Policy

- ✓ *1. Select Policy Template
- *2. Policy Name and Scope
- *3. Manage Rules
  - *3.1 Select Rule Template
  - *3.2 Rule Name and Priority
  - 3.3 Rule Scope
  - *3.4 Rule Conditions
- *4. Set Compliance Statement
- 5. Set Notifications
- 6. Set Policy Permissions
- *7. Review Policy (2) Policy Name and Scope — 305

*Policy Name: MS Windows Server 2003 Security - Standalone Server Role — 352

Description: This policy enforces Microsoft Security Rules for Server 2003 Hosts — 354

*Policy Scope:
- ● App Policy to CMDB group
  Tokyo Data Center — 356
- ○ Apply Policy to IP Address range e.g. 10.1.1.*, 172.52.10.20/5, 1.0.0.0 - 2.0.0.0

Policy Coverage [Calculate Scope Contents]

The policy scope contains:    558   Host
   1,007   Services
   93,454   Connections

358

*Required

[<Back] [Next>] [Finish] [Cancel] — 375

User: Joe Smith | Role: Compliancy Officer | 2007-05-01 19:20 (GMT) +01:00

Figure 7:
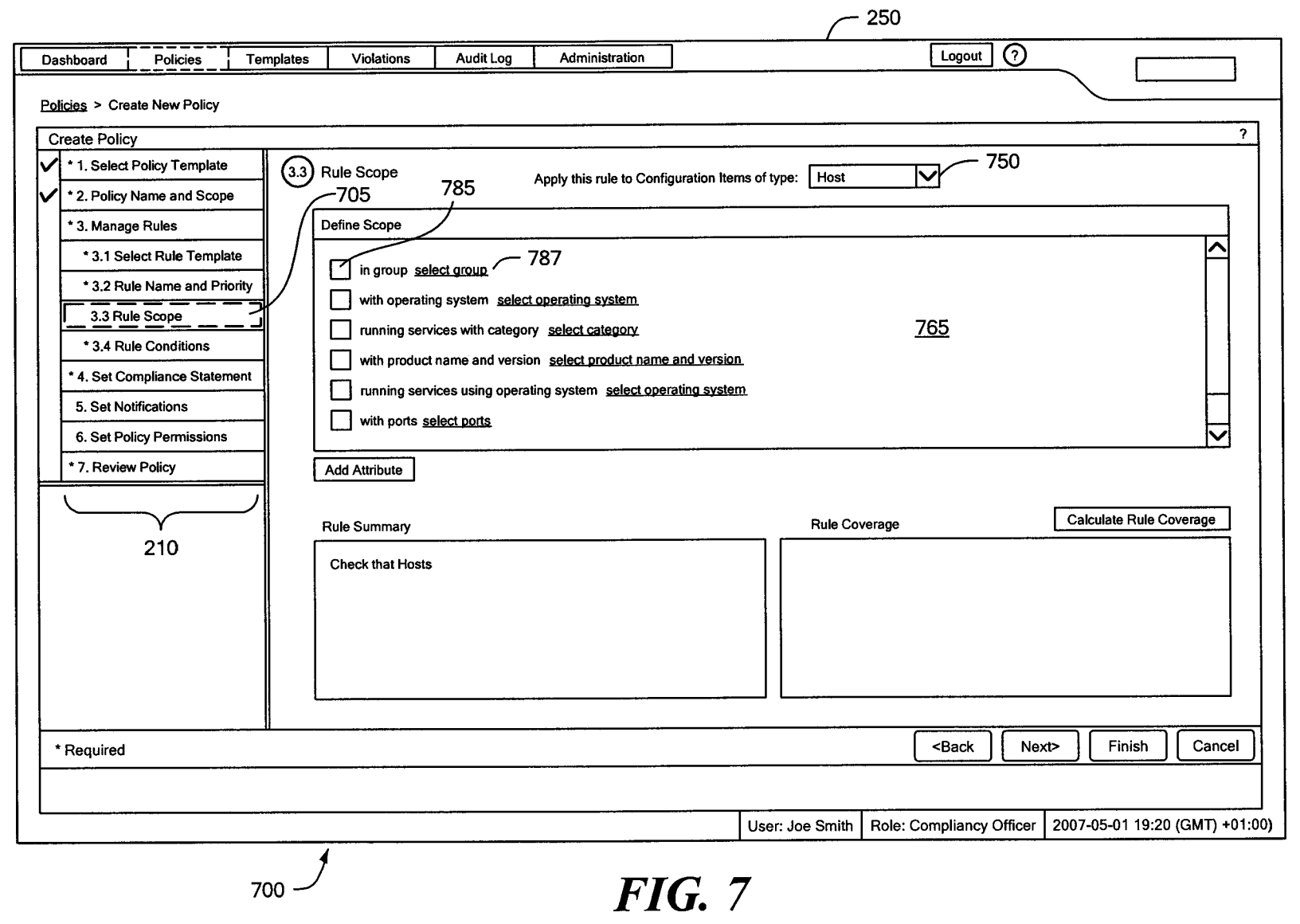

Policies > Create New Policy

Create Policy

- ✓ * 1. Select Policy Template
- ✓ * 2. Policy Name and Scope
- * 3. Manage Rules
  - * 3.1 Select Rule Template
  - * 3.2 Rule Name and Priority
  - 3.3 Rule Scope
  - * 3.4 Rule Conditions
- * 4. Set Compliance Statement
- 5. Set Notifications
- 6. Set Policy Permissions
- * 7. Review Policy (3.3) Rule Scope — 705

Apply this rule to Configuration Items of type: [Host ▼] — 750

Define Scope — 785

- ☐ in group <u>select group</u> — 787
- ☐ with operating system <u>select operating system</u>
- ☐ running services with category <u>select category</u>
- ☐ with product name and version <u>select product name and version</u>
- ☐ running services using operating system <u>select operating system</u>
- ☐ with ports <u>select ports</u>

765

Add Attribute

Rule Summary

Check that Hosts

Rule Coverage

[Calculate Rule Coverage]

* Required

[<Back] [Next>] [Finish] [Cancel]

User: Joe Smith | Role: Compliancy Officer | 2007-05-01 19:20 (GMT) +01:00

FIG. 9

Create Policy
- ✓ *1. Select Policy Template
- ✓ *2. Policy Name and Scope
- *3. Manage Rules
  - *3.1 Select Rule Template
  - *3.2 Rule Name and Priority
  - Rule Scope
  - Rule Conditions
- *4. Set Compliance Statement
- 5. Set Notifications
- 6. Set Policy Permissions
- *7. Review Policy

} 210

Add Attribute

Add an attribute to the conditions scope

○ Use configuration item attribute
⦿ Use property in configuration file — 1020
○ Count the number of instances of a contained configuration item Property in Configuration file Config file: init.ora
Property: SERVICE-XDB
Hint of property type: text
Operator: is
Value: Disabled OK    Cancel

* Required

RULE-BASED NETWORK RESOURCE COMPLIANCE

RELATED APPLICATIONS

This application is related to United States Patent Application entitled "POLICY BASED NETWORK COMPLIANCE," as specified by Ser. No. 11/769,407, and United States Patent Application entitled "NETWORK POLICY ENFORCEMENT DASHBOARD VIEWS," as specified by Ser. No. 11/769,561, both of which are being filed a same date as the present application, the entire teachings of both of which are incorporated herein by this reference.

BACKGROUND

Conventional rule management applications enable a respective user to create a rule and perform certain functions such as compliancy checks. For example, conventional rule management systems can be used to ensure that a resource such as a client computer is compliant with a data security regulatory rule. If the client computer is not compliant, the conventional rule management system can provide notification to a network administrator regarding the violation.

SUMMARY

Conventional rule management applications such as those as discussed above suffer from a number of deficiencies. For example, although conventional rule management tools can be used to manage a set of rules and test for compliancy as mentioned above, use of conventional rule management systems can be quite tedious and time-consuming, especially when used to manage large groups of resources.

Techniques discussed herein deviate with respect to conventional applications such as those discussed above as well as techniques known in the prior art. For example, embodiments herein provide a novel and useful way for managing rules and their corresponding application to check compliancy.

More specifically, in one embodiment, a compliance manager executing on a computer system has access to a repository of collected data. The collected data can be obtained as a result of direct or indirect queries to resources in a respective network and/or (passive or active) monitoring of message information transmitted between resources in the network.

Based on input, the compliance manager enables creation of policies and rules to test compliancy of the network resources via evaluation of the corresponding collected data. For example, each of one or more rules associated with a respective network compliance policy can have a corresponding rule scope definition indicating which portion of the collected data in the repository to use for testing and verification purposes.

In one embodiment, the rule scope definition specifies a configuration item type (e.g., primary object) indicating items (e.g., host resources, connections, services, etc.) in the network to which a rule applies. In addition to configuration item type, the rule scope definition also specifies one or more scope attributes, each of which indicates one or more parameters associated with the configuration item type. A combination of the configuration item type and the scope attributes in the rule scope definition indicates which portions of the collected data to use in the verify process. In other words, according to embodiments herein, the rule scope defines portions of the collected data (e.g., information associated with the network resources) to retrieve for checking compliance.

In addition to having a respective rule scope definition, each rule can have a corresponding set of selected compliance conditions. The compliance conditions specify the desired state for the rule scope and/or values the portions of the collected data as specified by the rule scope definition should be in order to be compliant.

As an example, during a compliancy check, the compliance manager applies the rule scope definition to the collected data to identify a set of network resource data to be verified. Thereafter, the compliance manager determines compliancy of the network resources by checking whether the set of network resource data matches or passes the test as specified by the corresponding compliance conditions specified for the rule. If so, the network resources are compliant. If not, the network resources are non-compliant.

These and other embodiments such as policy coverage information, rule coverage information, creation of rules, creation of rule scope definitions, management of rules, etc. will be discussed later in this specification.

Note that embodiments disclosed herein include any type of computerized device, workstation, handheld or laptop computer, or the like configured with software and/or circuitry (e.g., a processor) to process any or all of the method operations disclosed herein. In other words, embodiments herein can include a computerized device such as a computer or a data communications device or any type of processor that is programmed or configured to provide rule management functions as explained herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

In addition to the embodiments discussed above, other embodiments herein include a computerized device (e.g., a host computer, workstation, etc.) configured to support the techniques disclosed herein such as management of compliance policies and corresponding rules. In such embodiments, a computer environment to carry out the invention includes a memory system, a processor (e.g., a processing device), a respective display, and an interconnect connecting the processor and the memory system. The interconnect can also support communications with the respective display (e.g., display screen or display medium). The memory system can be encoded with an application that, when executed on a respective processor, supports compliance management according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to support rule management and related functions according to embodiments herein. For example, the computer program logic, when executed on at least one processor associated with a computing system, causes the processor to perform the operations (e.g., the methods) indicated herein as embodiments of the present disclosure. Such arrangements as further disclosed herein can be provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

As an example, a more particular technique of the present disclosure is directed to a computer program product or computer environment that includes a computer readable medium having instructions stored thereon to facilitate rule management functions. The instructions and corresponding execution support operations of: i) receiving a rule scope definition including: a configuration item type that defines a category of resources in a network of different types of resources and a scope attribute of the configuration item type, the scope attribute (indicating at least one parameter) used for retrieval of resource data corresponding to the configuration item type; ii) receiving selection of compliance conditions that define the desired state to be applied to or expected of the resource data associated with corresponding resources in the network as specified by the rule scope definition; and iii) utilizing the rule scope definition and compliance conditions to produce a rule for application to the resource data to determine compliance with respect to the corresponding resources.

Other embodiments of the present disclosure include hardware and/or software programs to perform any of the method embodiment steps and operations summarized above and disclosed in detail below.

It should be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

Techniques herein are well suited for use in applications such as those supporting policy and/or rule management in a network environment. However, it should be noted that configurations herein are not limited to such use and thus configurations herein and deviations thereof are well suited for use in other environments as well.

Each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below. Although not exhaustive, the claims section also provides different perspectives of the invention based on matter recited in the specification.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 2 is an example screenshot illustrating a graphical user interface enabling selection of different compliance policy templates according to embodiments herein.

FIG. 3 is an example screenshot illustrating a graphical user interface enabling naming of a compliance policy and corresponding compliance policy scope according to embodiments herein.

FIG. 5 is an example screenshot illustrating a graphical user interface enabling selection of a rule template according to embodiments herein.

FIG. 7 is an example screenshot illustrating a graphical user interface enabling creation of a rule scope according to embodiments herein.

FIG. 9 is an example screenshot illustrating a graphical user interface enabling creation of a rule scope according to embodiments herein.

FIG. 11 is an example screenshot illustrating a graphical user interface enabling creation of a rule scope attribute according to embodiments herein.

FIG. 13 is an example screenshot illustrating a graphical user interface enabling selection of compliance conditions according to embodiments herein.

FIG. 14 is an example screenshot illustrating a graphical user interface enabling management of rules according to embodiments herein.

FIG. 15 is an example screenshot illustrating a graphical user interface enabling setting of a compliance statement according to embodiments herein.

DETAILED DESCRIPTION

According to one embodiment, a compliance manager enables creation of policies and rules to test compliancy of network resources via evaluation of collected data associated with the network resources. For example, each of one or more rules associated with a respective network compliance policy has a corresponding rule scope definition indicating which portion of collected network resource data to use for verification purposes. Each rule also has a corresponding set of selected compliance conditions associated with it. The compliance conditions specify what values the portions of collected resource data as specified by the rule scope definition should be in order to be compliant. In one embodiment, a network administrator initiates creation of the rules based on use of a compliance manager (e.g., a graphical user interface) executing on a computer system.

During a compliancy check, when the compliance manager determines whether network resources are complaint with a rule, the compliance manager applies a corresponding rule scope definition associated with the rule identify a portion of resource data to be verified. Thereafter, the compliance manager determines compliancy by checking whether the produced set of network resource data matches a set of values or passes tests as specified by the corresponding compliance conditions for the rule. Each of the policies also has a policy scope indicative of the resources the policy applies to. The individual rule scope may therefore be narrower or equal to the policy scope.

The collected data can be obtained as a result of direct queries to resources in a respective network and/or monitoring (e.g., passive monitoring) of message information transmitted between the network resources. Thus, according to embodiments herein, the compliance manager can verify compliance with respect to application configurations (e.g., based on the direct queries) as well verify compliance with respect to two or more applications that communicate over a respective network based on message information transmitted between the two or more applications.

Figure 1:
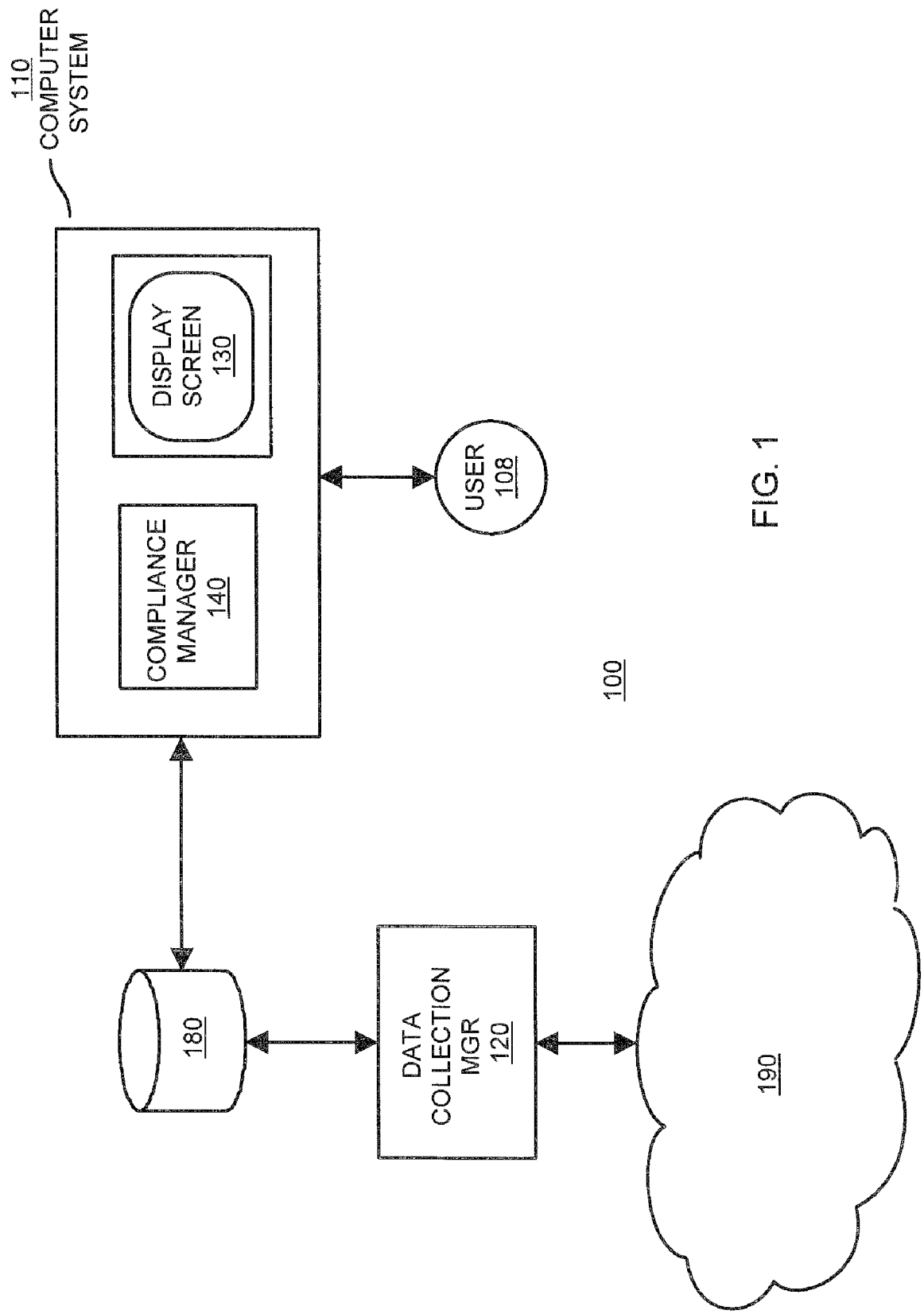
FIG. 1 is an example diagram illustrating collection of resource data and use of a compliance manager according to embodiments herein.

FIG. 1 is an example diagram illustrating collection of resource data and use of a compliance manager 140 and related functions according to embodiments herein. As shown, communication environment 100 includes network 190, data collection manager for applications 120, repository 180, computer system 110, display screen 130, compliance manager 140, and user 108.

As its name suggests, data collection manager 120 collects data (e.g., network resource information) from resources, services, processes, switch applications, etc. operating and/or present in network 190. Network 190 can include one or more networks of sub-resources having data collected by data collection manager 120.

Data collection manager 120 can be configured to collect information in many different ways. For example, data collection manager 120 can initiate direct queries to resources in respective network 190. Queries can include requests for configuration data associated with a queried resource. Responses to queries can include data such as version information associated with a particular application, vendor information, etc. associated with a queried resource. Data collection manager 120 then stores the received information in repository 180 for application of compliance policies and corresponding rules.

Note that the data collection manager 120 can also retrieve information from resources based on indirect queries. For example, the data collection manager 120 can communicate with agents that collect resource data on behalf of the data collection manager 120.

In addition to direct and indirect queries, the data collection manager 120 can also monitor connections or connectivity by monitoring message information transmitted between the network resources present in network 190. For example, the data collection manager 120 can be configured to analyze the message data transmitted in network 190 and store appropriate information about different monitored connections in repository 180.

Based on analyzing the message data, the data collection manager 120 can identify different types of information such as a protocol used to support communicates between applications, whether two or more applications communicate via encrypting data, types of information exchanged between the two or more, which applications communicate with each other, etc. The compliance manager can apply rules to identify whether certain applications are allowed to communicate with each other or whether the applications communicate with each other using a proper protocol as specified by a rule.

In one embodiment, the data collection manager 120 analyzes the collected data and stores the information as objects in a repository 180 (e.g., a database or other storage device). Each object in the repository includes information associated with a respective resource in the network 190. Storage of the collected information (and/or other derived information) can include classifying the information in one of three classes such as whether the resource information is associated with a host resource, a connection, or service in network 190. This classification is only example and can be extended to any number of classes, sub-classes, etc.

As an example of an embodiments herein, the network 190 can include resources such as clients, servers, switches, storage devices, host resource, connections supporting communications between computer systems, services, etc. in network 190. A network resource such as a client resource (e.g., a computer system) can be classified as a host resource. The computer system can support a number of applications such as an operating systems, text editor applications, e-mail applications, etc. Upon collection of data associated with the sub-resources (e.g., operating system, text editors applications, etc.), the data collection manager stores 120 stores the information in objects. Each object (e.g., representing a resource or sub-resource) in the repository 180 includes information about the resource such as software version information, vendor information, computer system on which the application operates, etc.

In one embodiment, the data collection manager 120 stores the information in repository 180 as a hierarchical tree of information. Pointers associated with the objects indicate how the objects are related to each other.

Via retrieval of resource data in repository 180, the compliance manager 140 applies policies and corresponding rules to verify compliancy. Retrieval can be achieved via queries (e.g., SQL queries) applied to repository 180.

As will be discussed later in this specification, via a graphical user interface on display screen 130, the compliance manager 140 enables a respective user to create policies and corresponding rules to verify compliance with respect to resource configurations (e.g., based on information stored in repository 180 from the direct and indirect queries) as well verify compliance with respect to two or more resources that communicate with each other over network 190 (e.g., based on message information transmitted between resources).

Accordingly, one embodiment herein includes applying a rule to a repository of message data (passively or actively) collected from multiple application resources communicating with each other over the network. Based on a comparison of the compliance conditions to portions of the repository of message data as specified by the rule scope definition, a compliance manager identifies or determines compliancy with respect to the communicating application resources.

As mentioned above, the resource data can include configuration information associated with the resources in network 190. Based on application of rules to the repository of data, the compliance manager 140 is able to identify compliancy with respect to corresponding configurations of the application resources.

Figure 2:
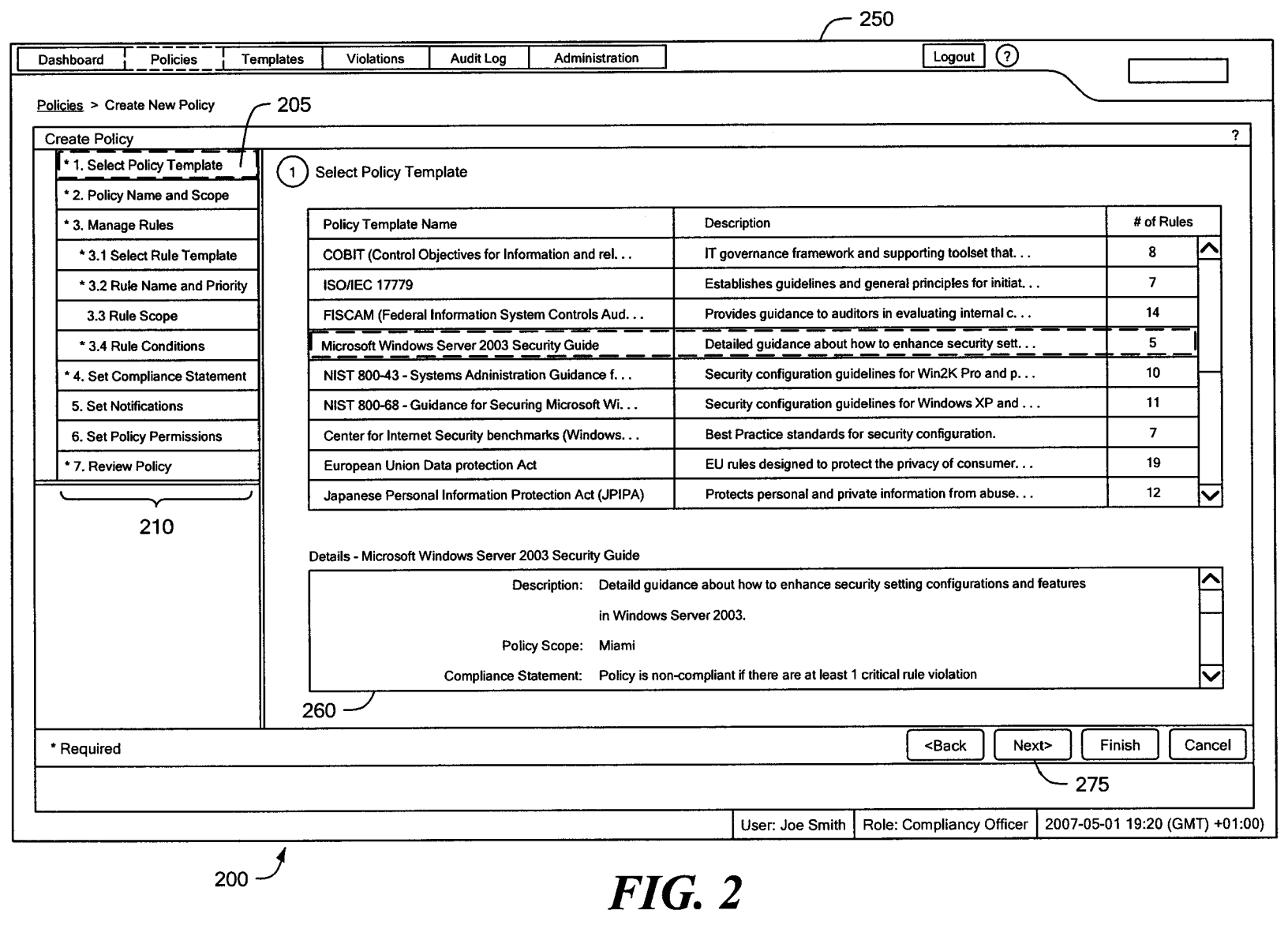

FIG. 2 is an example screenshot 200 illustrating a graphical user interface 250 as generated by compliance manager 140 for display on display screen 130 according to embodiments herein. As shown, graphical user interface 250 enables management of compliance policies. Menu 210 of graphical user interface 250 enables a respective network administrator to create compliance policies and corresponding rules using a step-by-step process.

For example, to create a new compliance policy, the user can select entry 205 from multiple policy templates in menu 210 that represent existing policies. The compliance manager 140 displays summary details associated with the selected compliance policy in viewing region 260. Upon selection of "next" symbol 275, the compliance manager 140 initiates display of the screenshot 300 as shown in FIG. 3.

FIG. 3 is an example screenshot 300 illustrating a graphical user interface 250 enabling a user to name a compliance policy and select a scope for applying the compliance policy according to embodiments herein.

For example, screenshot 300 illustrates details associated with the selected compliance policy template as in screenshot 200. To create a new compliance policy, the user renames the compliance policy via input with respect to display field 352. The user is able to provide a description of the compliance policy via input with respect to display field 354. The user identifies a scope of resources in network 190 to which the compliance policy applies via input with respect to display fields 356. As shown, the compliance policy scope can be defined as a group of resources in a geographic region, a range of network addresses, etc.

Based on the policy scope selection, the compliance manager 140 initiates display of compliance policy coverage information in display field 358 to notify the user of different resources (e.g., hosts, services, connections, etc.) to which the compliance policy applies. Upon selection of "next" symbol 375, the compliance manager 140 initiates display of screenshot 400 in FIG. 4.

Figure 4:
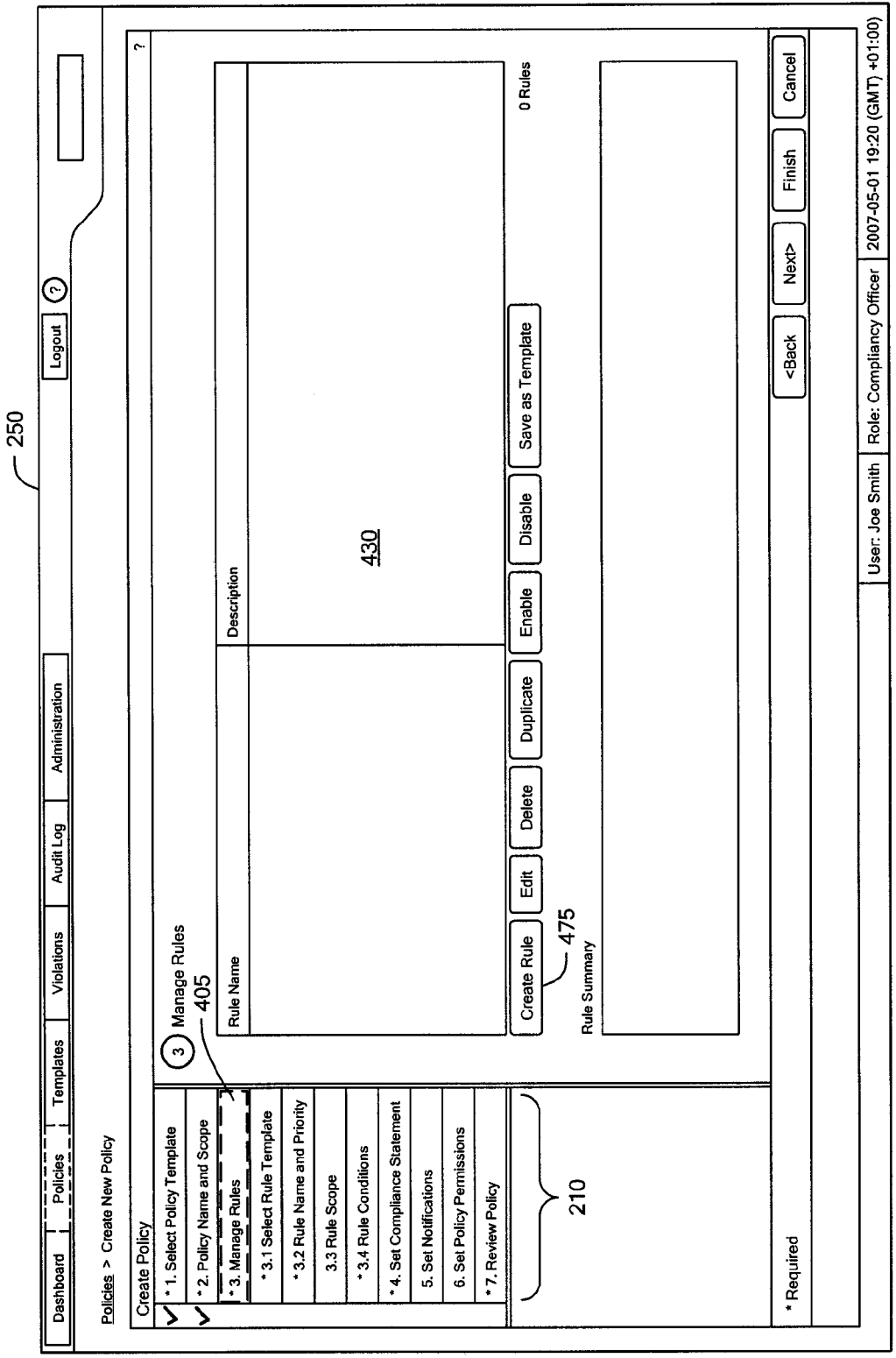
FIG. 4 is an example screenshot illustrating a graphical user interface enabling management of rules associated with a compliance policy according to embodiments herein.

FIG. 4 is an example screenshot 400 illustrating a graphical user interface 250 enabling management of rules associated with a compliance policy according to embodiments herein. Assume in this that the compliance policy named in the previous figure did not include any rules yet and the user creates one or more rules as in accordance with the following discussion.

In the context of the present example, the compliance manager 140 highlights entry 405 in menu 210 to provide an indication to the user 108 of a current processing step. For the current processing step (e.g., "manage rules" as indicated by entry 405), the compliance manager 140 initiates display of any rules in viewing region 430 that exists for the current compliance policy being created. As mentioned above, in this example, there are no rules displayed in viewing region 430 because there are currently no rules associated with the compliance policy being created. If any existed, they would be displayed in viewing region 430.

To create a rule for the current compliance policy, the user 108 selects the create rule symbol 475. In response to such a selection, the compliance manager 140 initiates display of screenshot 500 as specified in FIG. 5.

Figure 5:
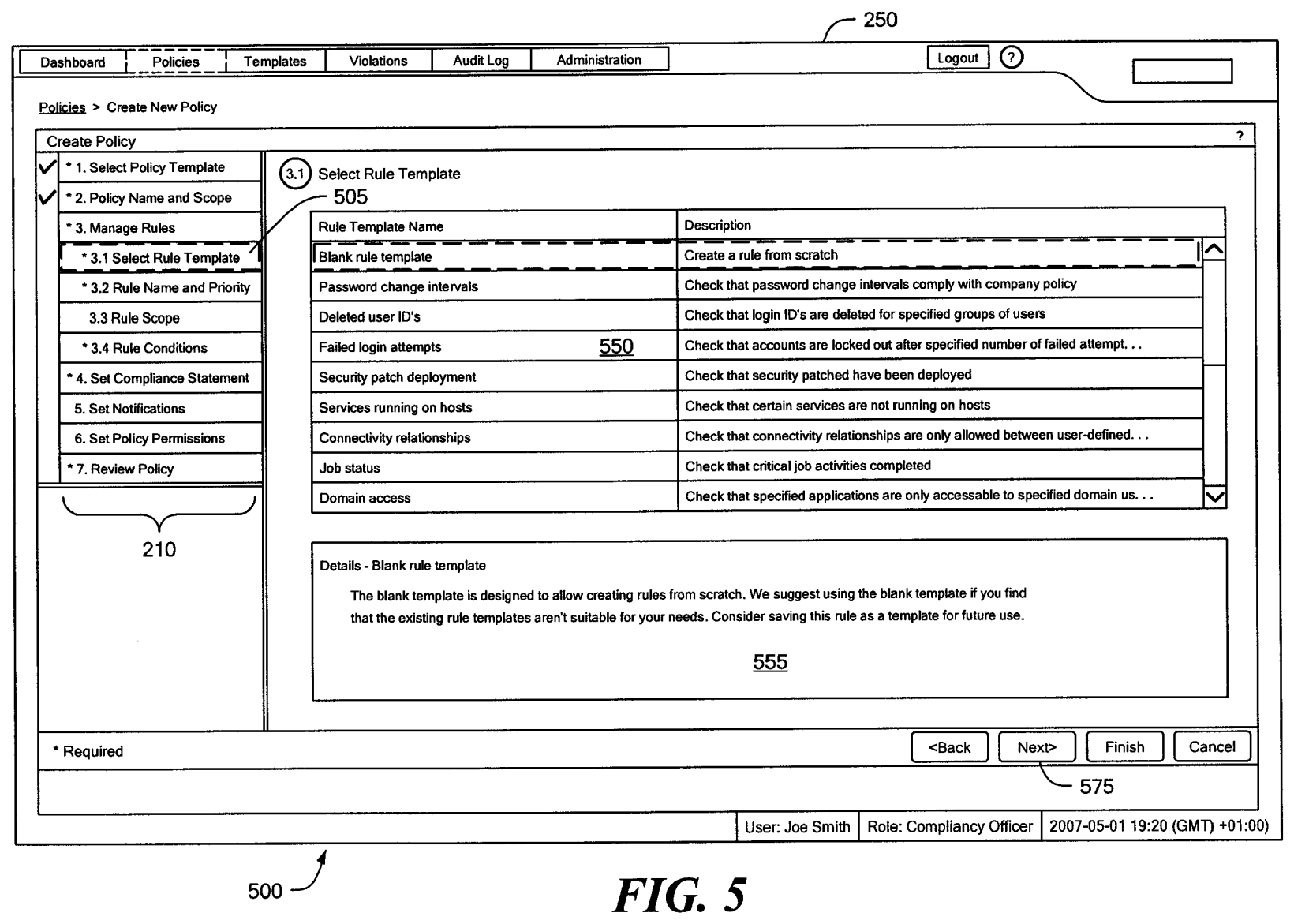

FIG. 5 is an example screenshot 500 illustrating a graphical user interface 250 enabling selection of one or more rule templates according to embodiments herein. The compliance manager 140 highlights entry 505 in menu 210 to provide an indication to the user 108 of a current processing step.

Each rule template includes details associated with a corresponding rule. Display of the available rules in this way enables user 108 to utilize the same rules in different compliance policies.

Upon selection of an entry in viewing region 550, the compliance manager 140 displays a corresponding summary in viewing region 555 for the selected rule template. Accordingly, a user 108 can easily identify whether to use the corresponding rule template to create a respective rule.

In addition to displaying existing custom rules, the rule template information as specified in viewing region 550 includes a blank rule template. Selection of the blank rule template (e.g., the highlighted entry in viewing region 550) enables a respective user 108 to create a new rule from scratch. Upon selection of the blank rule template and "next" symbol 575, the compliance manager 140 initiates display of screenshot 600 in FIG. 6.

Figure 6:
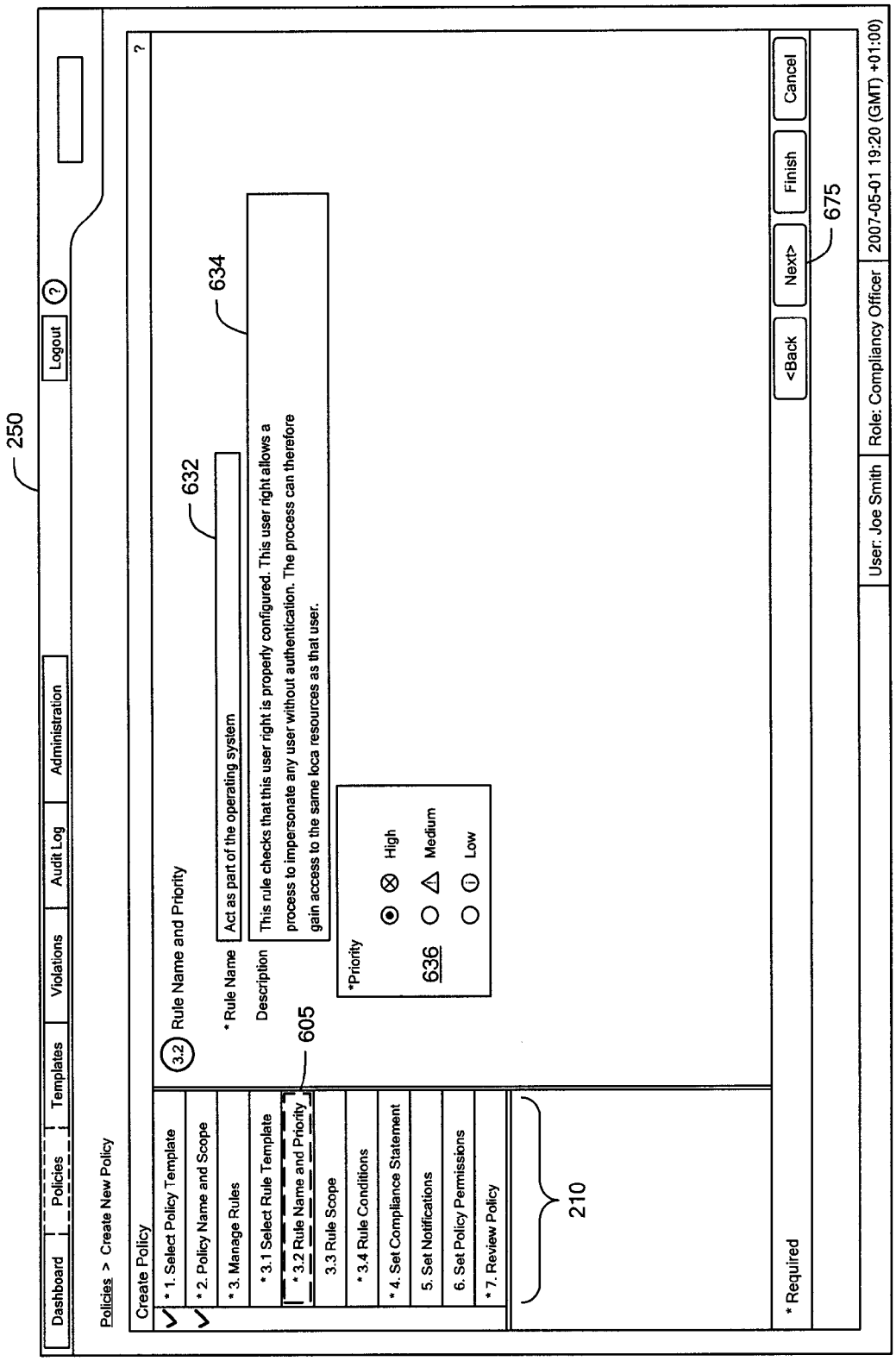
FIG. 6 is an example screenshot illustrating a graphical user interface enabling assignment of priority information to a rule according to embodiments herein.

FIG. 6 is an example screenshot 600 illustrating a graphical user interface 250 enabling rule naming and assignment of priority level information to a rule according to embodiments herein. The compliance manager 140 highlights entry 605 in menu 210 to provide an indication to the user 108 of a current processing step.

In the context of the present example, the user 108 names the currently created rule via input with respect to display field 632. In addition to naming the rule, the user 108 supplies a description of the newly created rule via input with respect to display field 634.

Display region 636 enables a respective use 108 to select a priority or importance level associated with the newly created rule. For example, the user 108 has associated the newly created rule with a highest priority level as specified in screenshot 600. Upon selection of "next" symbol 675, the compliance manager 140 initiates display of screenshot 700 in FIG. 7.

FIG. 7 is an example screenshot 700 illustrating a graphical user interface 250 enabling a user 108 to define a rule scope according to embodiments herein. The compliance manager 140 highlights entry 705 in menu 210 to provide an indication to the user 108 of a current processing step.

Based on user input with respect to display region 750, the user 108 selects one or more configuration item types to which the rule applies. Examples of configuration item types include: host resources, services, and connections.

As previously discussed, the data collection manager 120 classifies of categorizes the collected information according into one of these general group types. In one embodiment, the configuration item type can be one or more of the following resources: i) a host resource in the network 190, ii) a connection resource between two or more resource applications communicating with each other in the network, and iii) a service resource providing a respective service function in the network.

In addition to enabling selection of a configuration item type in display region 750, the compliance manager 140 initiates display of display region 765 including additional attributes defining a respective rule scope to which a given rule applies. Enabling user 108 (e.g., a compliance officer or network administrator) to limit application of a respective rule to a configuration item type and resources having attributes as specified by the rule scope definition makes it easier to target which resources the rule applies as well as manage rule violations when they occur.

In one embodiment, the compliance manager 140 initiates display of a listing of predefined scope attributes depending on which configuration item type is selected by a respective user 108 in display region 750. In the context of the present example, the user 108 selects "host" as the configuration item type to which the rule applies. In response to such a selection, the compliance manager 140 initiates display of a list of predefined attributes in display region 765 that pertain to the configuration item type host. If connection or service were chosen instead, the compliance manager 140 would initiate display of a different listing of predefined scope attributes relevant to connection or service depending on which was selected.

Dynamically displaying a list of relevant attributes in display region 765 depending on selection of the configuration item type helps the user 108 to create a respective rule more quickly because the user 108 can select from a listing rather than create attributes from scratch.

Assume in the present example that a user 108 wants to apply the current rule to a particular grouping of resources. The first attribute (e.g., labeled "in group select group") in the list enables the user 108 to apply the rule to a grouping of resources.

To define the rule scope definition to apply to a grouping of resources, the user 108 clicks on display region 785 to associate the grouping attribute with the rule. In addition to selecting display region 785, the user 108 can delete a selected scope attribute by clicking again on display region 785. Thus, scope attributes can be toggled on and off based on input from a respective user 108.

Figure 8:
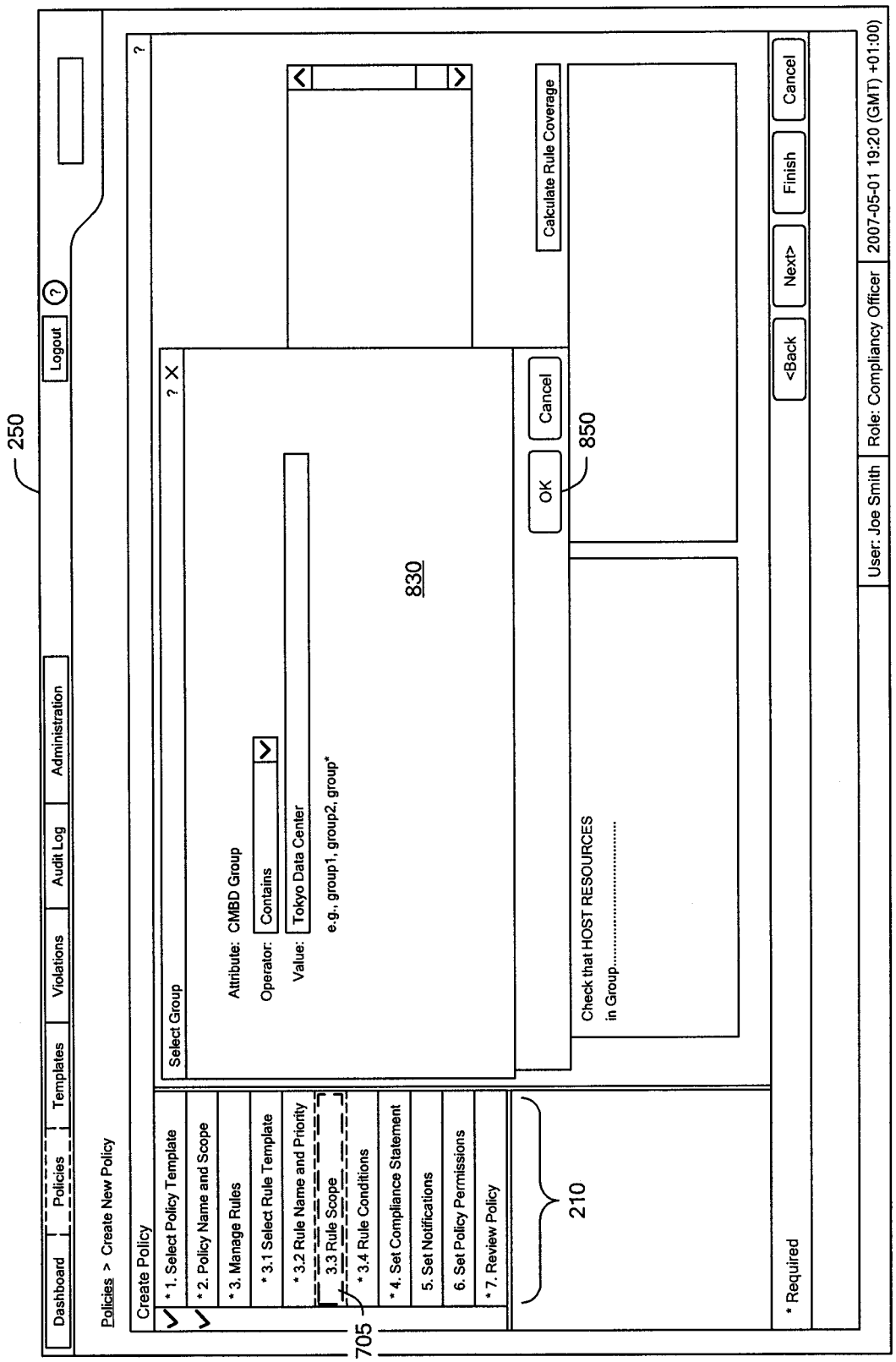
FIG. 8 is an example screenshot illustrating a graphical user interface enabling creation of a rule scope according to embodiments herein.

Upon selection of "select group" symbol 787 (e.g., group scope attribute), the compliance manager 140 initiates display of screenshot 800 in FIG. 8.

FIG. 8 is an example screenshot 800 illustrating a graphical user interface 250 enabling the user to define a scope attribute according to embodiments herein. The compliance manager 140 highlights entry 705 in menu 210 to provide an indication to the user 108 of a current processing step.

As shown, the compliance manager 140 initiates display of viewing region 830 enabling a respective user 108 to select a grouping scope attribute to further define the rule scope definition. In the context of the present example, the user selects a geographical location (e.g., Tokyo Data Center) as the grouping type. In this way, the user 108 specifies that present rule applies to collected data associated with the hosts (e.g., the selected configuration item type) in the Tokyo Data Center.

Note that in addition to a geographical type of grouping as mentioned above, the compliance manager 140 can enable selection of different types of rule scope attribute groupings. For example, the compliance manager 140 can enable selection of "grouping" type scope attributes based on different corporate departments (e.g., accounting, engineering, management, manufacturing, etc.) rather than groupings based on geographical location. In addition to department and location, the compliance manager 140 can support any other types of logical groupings of resources for the "grouping" scope attribute.

Figure 9:
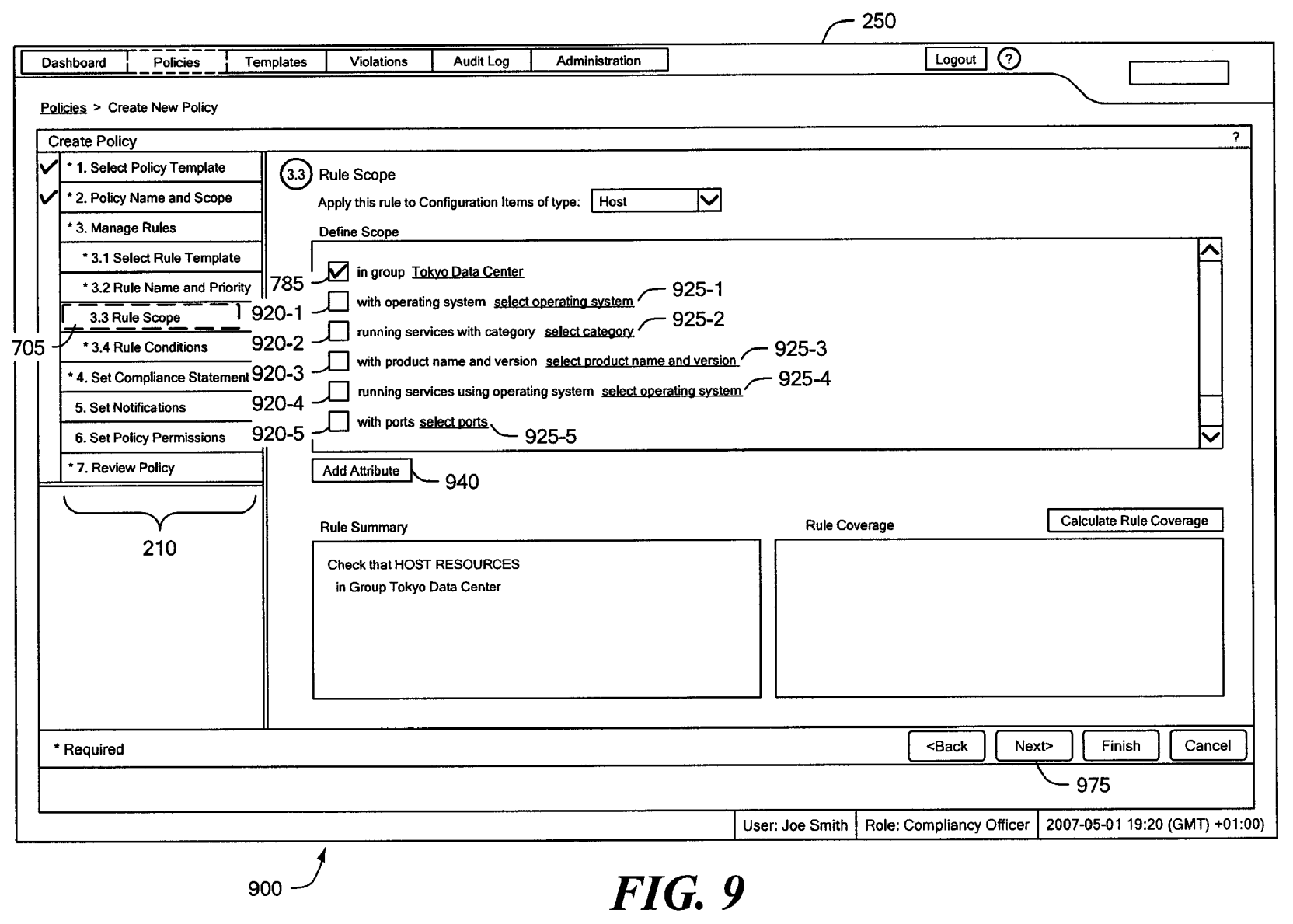

Upon selection of "OK" symbol 850 in viewing region 830 (indicating that the user 108 is done selecting a grouping type attribute), the compliance manager 140 initiates display of screenshot 900 in FIG. 9.

FIG. 9 is an example screenshot 900 illustrating a graphical user interface 250 enabling creation of a rule scope according to embodiments herein. The compliance manager 140 highlights entry 705 in menu 210 to provide an indication to the user 108 of a current processing step.

The above example illustrated how the respective user 108 can indicate a grouping type of scope attribute to which the rule applies. In addition to grouping, the user 108 can select other attributes 925 in which to apply the rule. For example, scope attribute 925-1 enables a respective user to apply the rule to hosts that run a particular type of operating system. To select attribute 925-1, the user clicks on display region 920-1 and thereafter clicks on "select operating system" to view a respective list one or more types of operating systems that the hosts are able to run.

Suppose that the user 108 defines the grouping scope attribute to be Tokyo data center as well as selects attribute 925-1 to be a Windows™ type of operating systems. In such an embodiment, the rule would apply to any collected resource data for hosts in Tokyo that run a Windows™ type operating system. As will be discussed, a user can specify the desired state based on attributes independent of the scope attributes. For example, the controller circuit can test resources in the Tokyo data center running a Windows™ operating system having at least a certain amount of memory.

Note that a scope definition can be a logical AND (e.g., as discussed above) or OR of the different scope attributes selected by a user 108. Use of the ANDed scope attributes was discussed above.

Logical OR'ing of the above scope attribute example (e.g., when both display region 785 and display region 920-1 are selected) would indicate that the rule applies to any host resource in the Tokyo data Center or any host in network 190 running Windows™ as an operating system.

The user 108 can also select display region 920-2 to further define a rule scope definition. For example, the user 108 can click on display region 920-2 and thereafter select a service type scope attribute to limit application of the respective rule to host types of resources running certain types of services. A user 108 can select one or more services from a listing that appears in response to selection of "select category" associated with attribute 925-2 in a similar manner as discussed above.

The user 108 can also select display region 920-3 to further define a rule scope definition. For example, the user 108 can click on display region 920-3 and thereafter select a product name and version type scope attribute to limit application of the respective rule to host types of resources having a specified vendor name and version. For example, a user 108 can select one or more name and version attributes from a listing that appears in response to selection of "select product name and version" associated with attribute 925-3.

The user 108 can also select display region 920-4 to further define a rule scope definition. For example, the user 108 can click on display region 920-4 and thereafter select services type scope attribute to limit application of the respective rule to host types of resources that run services using a particular operating system. For example, a user 108 can select one or more operating system types from a listing that appears in response to selection of "select operating system" associated with attribute 925-4.

The user 108 can also select display region 920-5 to further define a rule scope definition. For example, the user 108 can click on display region 920-5 and thereafter select a port type scope attribute to limit application of the respective rule to host types of resources having particular ports. For example, a user 108 can select one or more ports from a listing that appears in response to selection of "select ports" associated with attribute 925-5.

In addition to providing predefined scope attributes (e.g., grouping, operating system, services, etc.) as discussed above, the compliance manager 140 can enable a respective user 108 to create their own scope attribute from scratch. For example, a user can click (e.g., select via a pointer as described herein) on "add attribute" symbol 940 to create their own unique attribute not presented as a predefined attribute (e.g., attributes 925).

Figure 10:
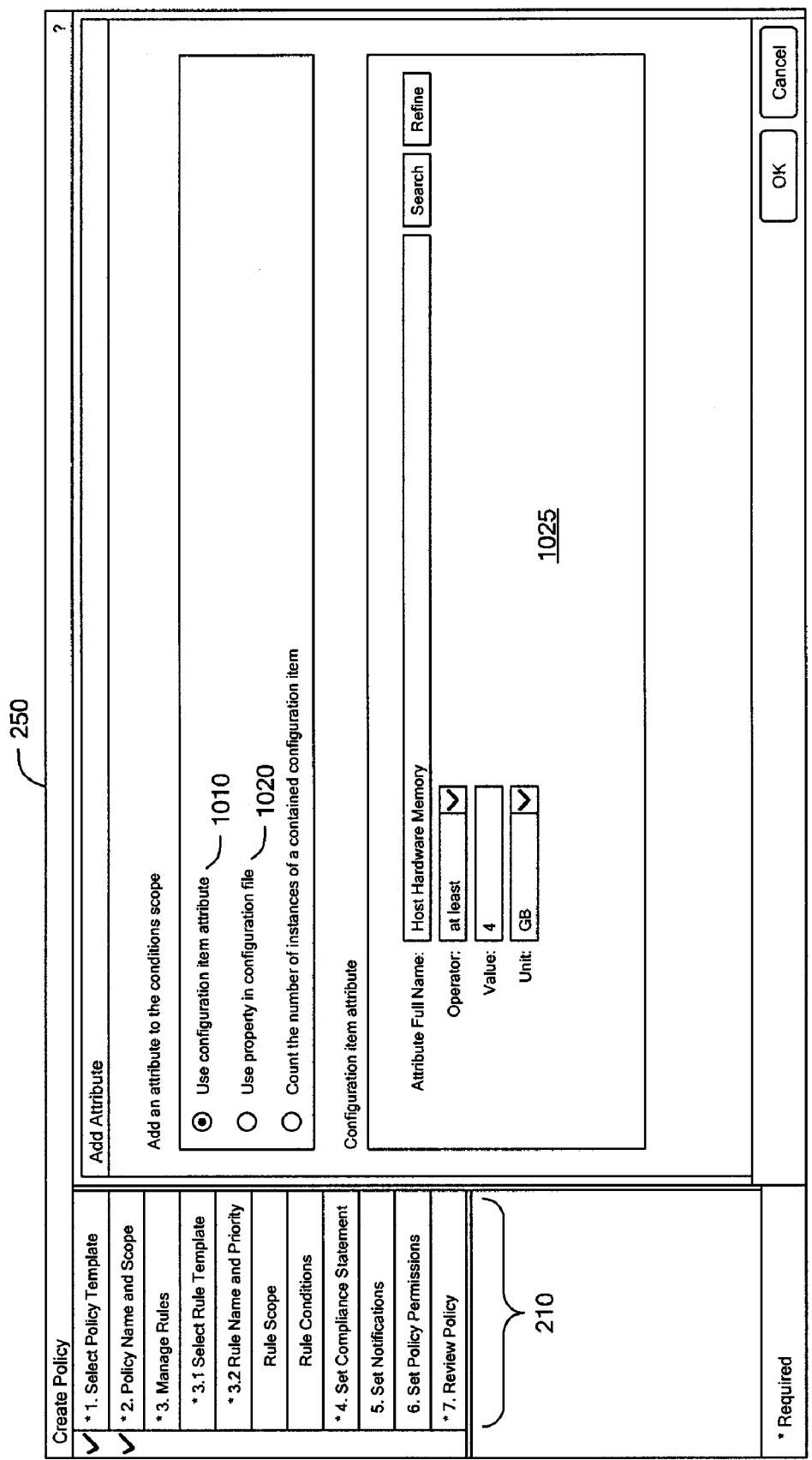
FIG. 10 is an example screenshot illustrating a graphical user interface enabling creation of a rule scope attribute according to embodiments herein.

Upon selection of "add attribute" symbol 940, the compliance manager 140 initiates display of screenshot 1000 in FIG. 10.

FIG. 10 is an example screenshot 1000 illustrating a graphical user interface 250 enabling creation of a rule scope attribute according to embodiments herein. As shown, the user 108 can specify to use a configuration item attribute associated with the configuration item type.

As mentioned above, in the context of the present example, assume that the user 108 has selected host as a configuration item type. Upon selection of option 1010, the compliance manager 140 initiates display of viewing region 1025 enabling a respective user 108 to select from a listing of configuration item attributes and corresponding values. In the present example, the user 108 defines the rule scope to be hosts having host hardware memory of at least 4 Gigabytes of corresponding memory. Thus, this rule would be applied to hosts (in the Tokyo data center if only display region 785 is selected) having host hardware memory of at least 4 Gigabytes of corresponding memory.

Upon selection of option 1020, the compliance manager 140 initiates display of screenshot 1100 in FIG. 11. As shown, the compliance manager 140 enables a respective user 108 to further limit the rule scope to hosts in which a corresponding property or setting in a configuration file of the host is set a specified value.

Accordingly, based on to the graphical user interface as discussed, with respect to FIGS. 7-9, embodiments herein enable creation of a rule scope definition based on a first rule scope definition display option (e.g., natural language option) in which a respective user creates a rule scope definition by selecting scope attribute from a list of predefined scope attributes (e.g., selectable parameters presented to the user).

As shown in FIGS. 10-11, embodiments herein enable creation of the rule scope definition based on a manual mode option in which the respective user manually defines the scope attributes to create a rule scope definition.

After completing a rule scope definition via selection of the different scope attributes, the user clicks on "next" symbol 975 as shown in FIG. 9. In response to selection of symbol 975, the compliance manager 140 initiates display of screenshot 1200 in FIG. 12.

Figure 12:
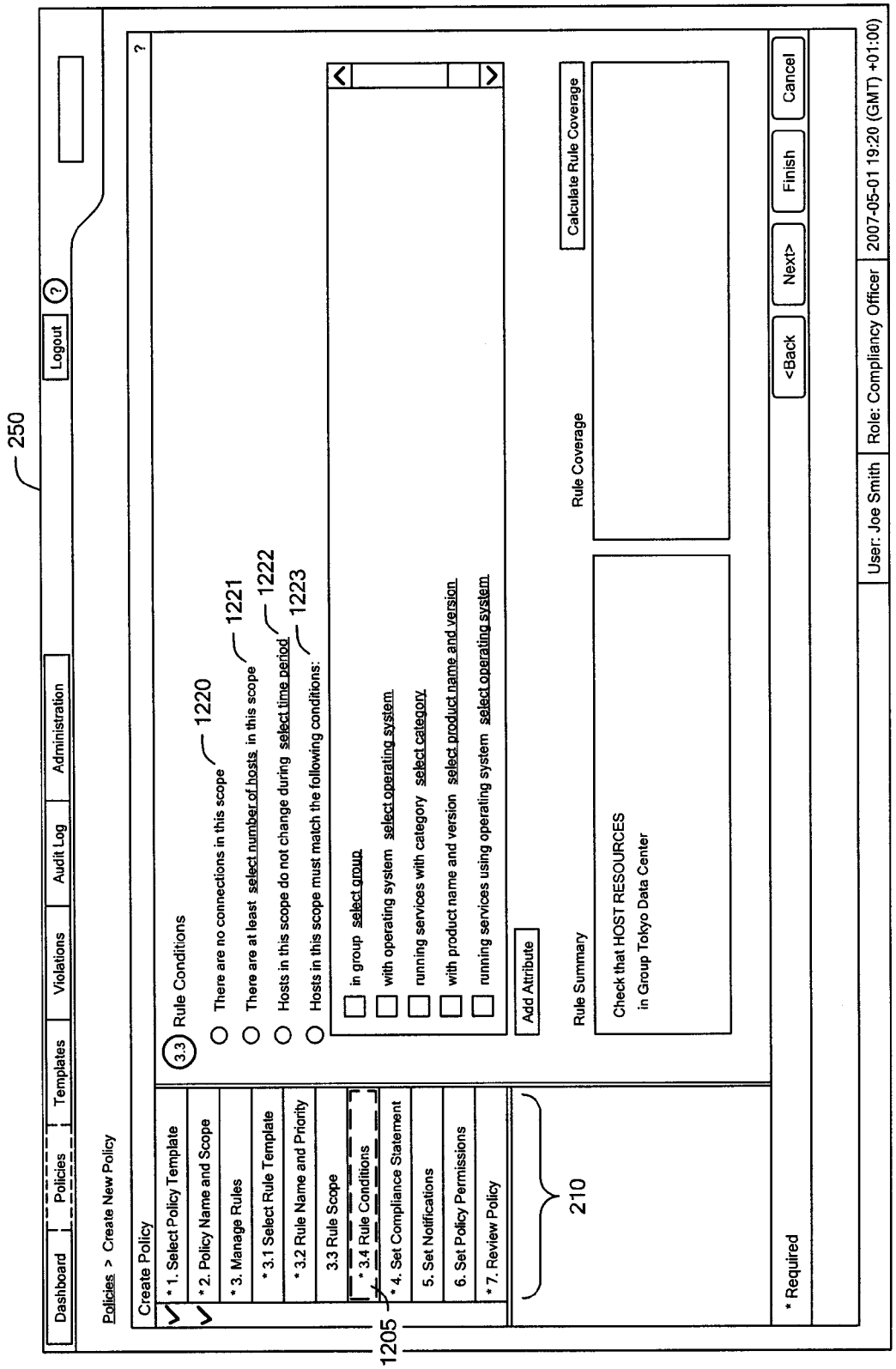
FIG. 12 is an example screenshot illustrating a graphical user interface enabling selection of compliance conditions according to embodiments herein.

FIG. 12 is an example screenshot 1200 illustrating a graphical user interface 250 enabling the user 108 to create compliance conditions according to embodiments herein. The compliance manager 140 highlights entry 1205 in menu 210 to provide an indication to the user 108 of a current processing step.

The previous figures discuss a way to define which resources in network 190 (or which objects stored in repository 180) to apply the corresponding rule. Rule conditions (e.g., as discussed with respect to FIGS. 12 and 13) enable the respective user 108 to define the compliance conditions (e.g., tests) to be applied to resource data in repository 180 satisfying the rule scope definition.

For example, as shown in screenshot 1200 of FIG. 12, a respective user 108 can select option 1220 from a predefined list of compliance conditions. Selection of option 1220 enables the user to cause a rule violation if there are no connections associated with resources that satisfy the defined rule scope as discussed above.

A respective user 108 can select option 1221 from the predefined list of compliance conditions. Selection of option 1221 enables the user to cause a rule violation if there are not at least a certain number of host resources in network 190 that satisfy the defined rule scope as discussed above. Based on selection of "selection number of hosts", the user 108 can select a corresponding threshold value for the compliance conditions.

A respective user 108 can select option 1222 from the predefined list of compliance conditions. Selection of option 1222 enables the user to cause a rule violation if the number of hosts that satisfy the defined rule scope as discussed above changes (or does not change depending on how the compliance conditions are configured) during a selected time period.

Lastly, a respective user 108 can select option 1223 from the predefined list of compliance conditions. Selection of option 1223 enables the user to select different compliance conditions as specified in display region 1350 of FIG. 13. In the context of the present example, the user selects display region 1375 and specifies (via further selection of "Windows") compliance conditions that any resources as specified by the rule scope definition must run services using a specified type of Windows™ operating system. Thus, if the configuration item type and rule scope definition is hosts in the Tokyo data Center, then the rule is violated for any hosts that do not run services using the Windows operating system. Accordingly, a network administrator can be apprised of such a condition and correct the problem.

As mentioned above, a user can select the "add attribute" symbol 940 in FIG. 9 to create additional rule scope attributes via the respective screenshots in FIGS. 10 and 11. Note that the "add attribute" symbol 1345 in FIG. 13 can be selected by a user to create rule conditions (i.e., compliance conditions) associated with a corresponding rule in addition to those in display region 1350 and the corresponding four selectable bullet items (e.g., "There are no connections in this scope", There are at least select number of hosts in this scope", etc.).

For example, while in the rule conditions mode when a respective user is in a process of creating compliance conditions associated with the rule, in response to selection of "add attribute" symbol 1345 in screenshot 1300, the compliance manager 140 initiates display of the screenshot 1000 and/or screenshot 1100 depending on the option (e.g., option 1010 or option 1020) selected by a user 108. Based on input, the user can create the compliance conditions or tests associated with the rule in a similar way that the user was able to create scope attributes associated with the rule as discussed above.

As an example, assume that the user defines the rule scope definition as any host resource in the Tokyo data center. By selecting "add attribute" 1345 in screenshot 1300 and creating compliance conditions via use of screenshot 1000, the user can create a rule that all host resources in the Tokyo data center must have at least four Gigabytes of host hardware memory. Otherwise the rule fails. In comparison to the example discussed earlier, the selection in screenshot 1000 was used to define the scope of the rule. In that example, recall that the user 108 defined the rule scope to be hosts having host hardware memory of at least 4 Gigabytes of corresponding memory. Thus, via such a rule scope definition, the rule would be applied to hosts (in the Tokyo data center if only display region 785 is selected) having host hardware memory of at least 4 Gigabytes of corresponding memory.

Accordingly, scope attributes can be used as compliance conditions and vice versa. This affords the user flexibility when creating and applying rules.

Figure 13:
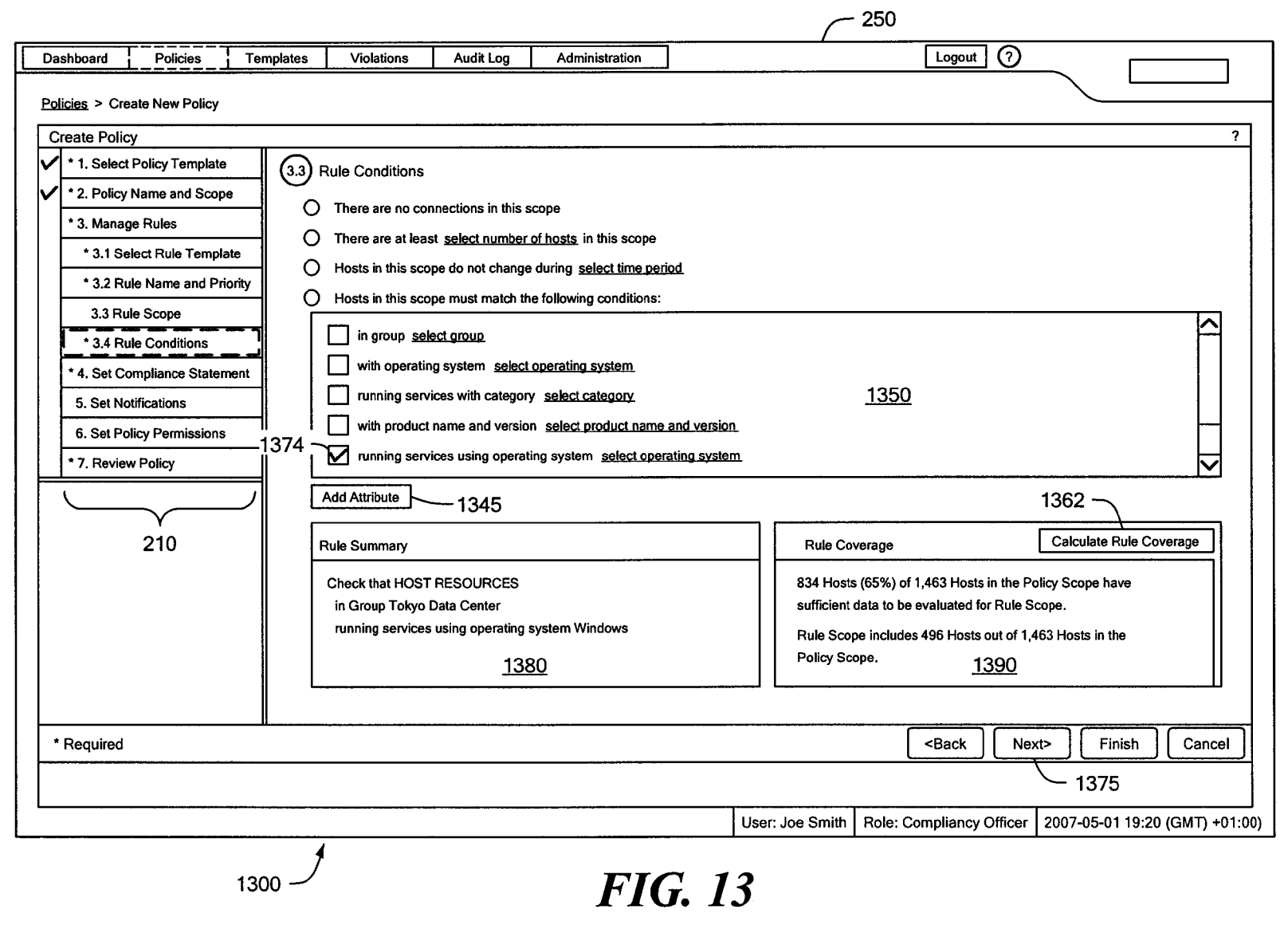

In FIG. 13, the compliance manager 140 updates display region 1380 to include rule summary information as a respective user 108 creates the corresponding rule. Thus, the user 108 can check whether he has made a mistake with respect to the rule.

Compliance manager 140 populates display region 1390 of graphical user interface 250 to notify the respective user of rule coverage information. In one embodiment, the compliance manager 140 creates the rule coverage information for a corresponding rule scope definition by specifying a number of resources in the network to which the rule applies. Note that the rule coverage information can be dynamically (e.g., automatically) displayed without further input from a user or in response to selection of "calculate rule coverage" symbol 1362.

As an example of rule coverage information, the compliance manager 140 indicates that the current created rule has a rule scope including 496 hosts of 1463 hosts in the policy scope.

As previously discussed, the current rule can be associated with a compliance policy. Recall that the compliance policy has an associated compliance policy scope to which the compliance policy applies. In this example, based on the compliance policy scope and checking of resource data stored in repository 180, the compliance manager 140 identifies that the compliance policy applies to 1463 hosts. A rule coverage check for the rule scope indicates that the rule applies to 496 hosts. Presenting the compliance policy coverage information and rule coverage information in this way enables a respective network administrator to check the rule and policy for possible errors prior to applying the compliance policy and corresponding rule to contents of repository 180.

Accordingly, embodiments herein include identifying an amount of the resources in the network 190 to which a compliance policy applies; identifying a portion of the amount of resources in the policy scope to which the rule applies; and providing notification of at least one the portion of the amount of resources to which the rule applies relative to the amount of the resources in the network to which the compliance policy applies.

In addition to notifying the user of relative coverage information, the compliance manager 140 can also check the repository 180 to identify which portion of the resources (e.g., hosts) as specified by the policy scope have sufficient data to be evaluated for the rule scope. For example, the compliance policy has a corresponding compliance policy scope of resources to which the compliance policy applies. The compliance manager 140 utilizes the compliance policy scope to identify a number of resources in the network having sufficient resources data to be evaluated.

Figure 14:
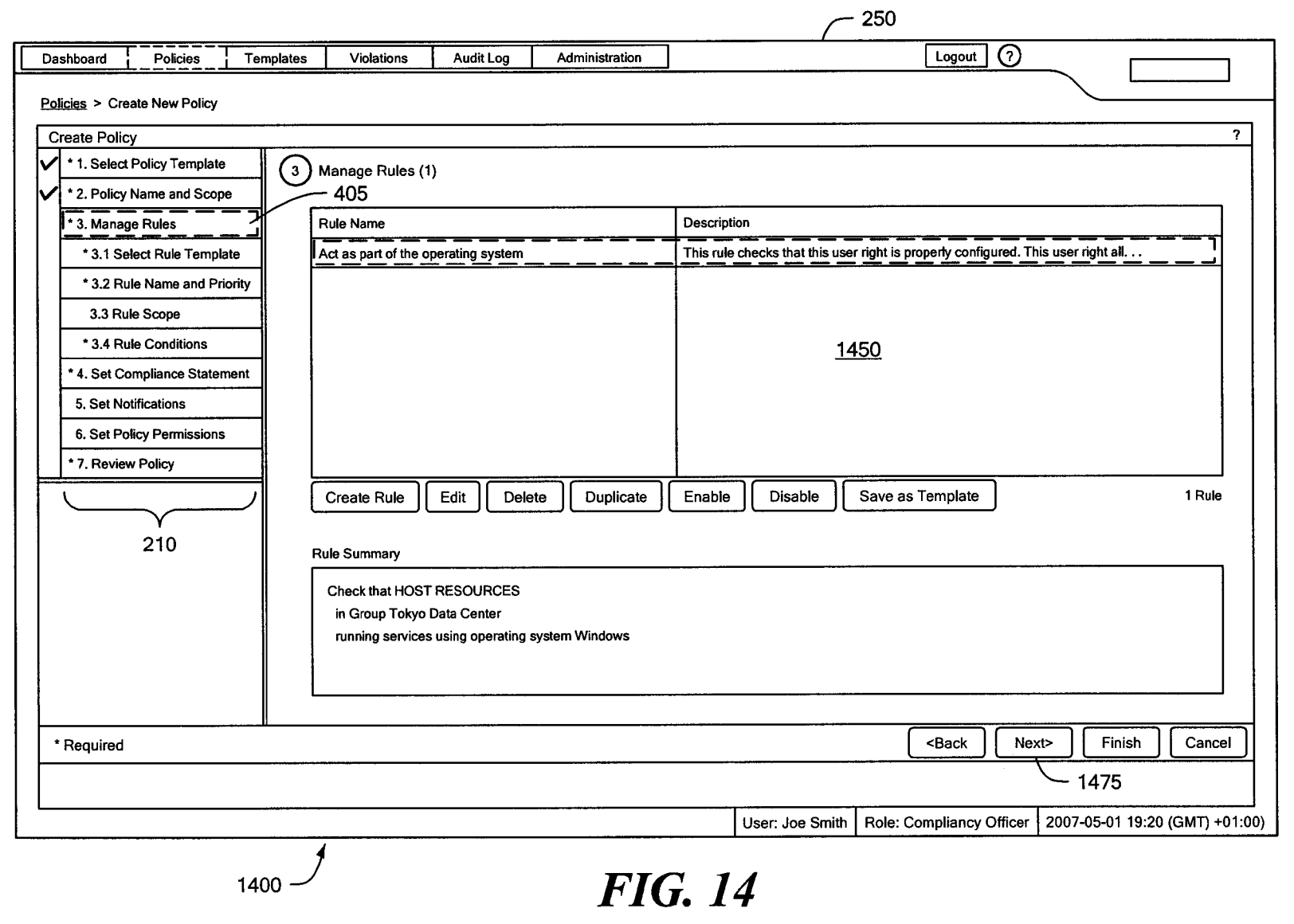

Upon selection of "next" symbol 1375, the compliance manager 140 initiates display of screenshot 1400 in FIG. 14.

FIG. 14 is an example screenshot 1400 illustrating a graphical user interface 250 illustrating completion of rule creation according to embodiments herein. This completes the loop of creating at least one rule for a newly created compliance policy. The compliance manager 140 highlights entry 705 in menu 210 to provide an indication that the user 108 can create additional rules for the compliance policy being created.

Display region 1450 provides a listing of the rule created in the previous figures. The user 108 can click on "create rule" symbol to create another rule for the current compliance policy, "edit" symbol to edit the currently highlighted rule in the compliance policy being created, "delete" symbol to delete the currently highlighted rule from the compliance policy being created, "duplicate" symbol to produce a copy of the currently highlighted rule, "enable" or "disable" symbol to activate or deactivate a rule in the compliance policy, and "save as template" symbol to save the newly created rule as an entry of the listing of rules as shown in display region 550 of FIG. 5.

Accordingly, the user 108 can repeat step 3.1 (e.g., select rule template), step 3.2 (e.g., rule name and priority), step 3.3 (e.g., rule scope), and step 3.4 (e.g., rule conditions) to create additional rule for the compliance policy being created.

The following list describes example rule cases (e.g., rule scope definition and compliance conditions) that can be created using the graphical user interface 250 as discussed herein:

| | |
|---|---|
| Application Configuration | Check that Oracle 10 g database servers in New York and San Jose have their shared_pool_size set to no more than 3500000 |
| Application Configuration | Check that there are no applications using ports 1024 to 65536 on Windows 2003 Servers in Miami that run Exchange |
| Application Configuration | Check that there's at least one DNS server configured in Chicago |
| Application Configuration | Check that Oracle Databases in New York have the Oracle HTTP/FTP capability disabled |
| Application Configuration | Check that retail web servers and their back-end databases aren't running on the same host |
| Host Configuration | Check that Web and Database Servers in the Human Resources and Finance departments running on Red Hat Linux 3 with less than 4 GB of physical memory have Red Hat Update 6 |
| Host Configuration | Check that all Oracle DB servers for the Inventory application have 2 or 4 CPUs |
| Host Configuration | Check that the Oracle servers in Seattle don't have floppy drives |

-continued

| | |
|---|---|
| Host Configuration | Check that no Linux servers in Asia are running SUSE Linux |
| Host Configuration | Check that the DB2 servers in Finance aren't running in Virtual Machines |
| Host Configuration | Check that all SAP servers used for General Ledger run in a cluster |
| Host Configuration | Check that all web servers in HR departments worldwide (except those in Dallas) are running Linux v3 |
| Host Configuration | Check that Windows systems in Chicago have Norton Antivirus installed |
| Host Configuration | Check that Windows systems in North America don't have Kazaa installed |
| Host Configuration | Check that retail banking web servers have Solaris security patch #1143 |
| Application Configuration Change | Check that no changes to Sybase DB configuration parameters are made between 09:00 and 17:00 GMT on weekdays |
| Application Dependency | Check that there are no more than 100 Outlook clients connected to each Exchange server in the EMEA region |
| Application Dependency | Check that there are no connections between Apache Web Servers in the DMZ and Application Servers in the Accounting Department |
| Application Dependency | Check that there are no connections using ports 80, 443 or 8080 on Windows 2003 File Servers in Miami |
| Application Dependency | Check that all connections from the Admissions Department to the Patient Records server use a secure protocol |
| Network Device Configuration | Check that all Cisco routers in the Phoenix data center have at least 3 interfaces |

Figure 15:
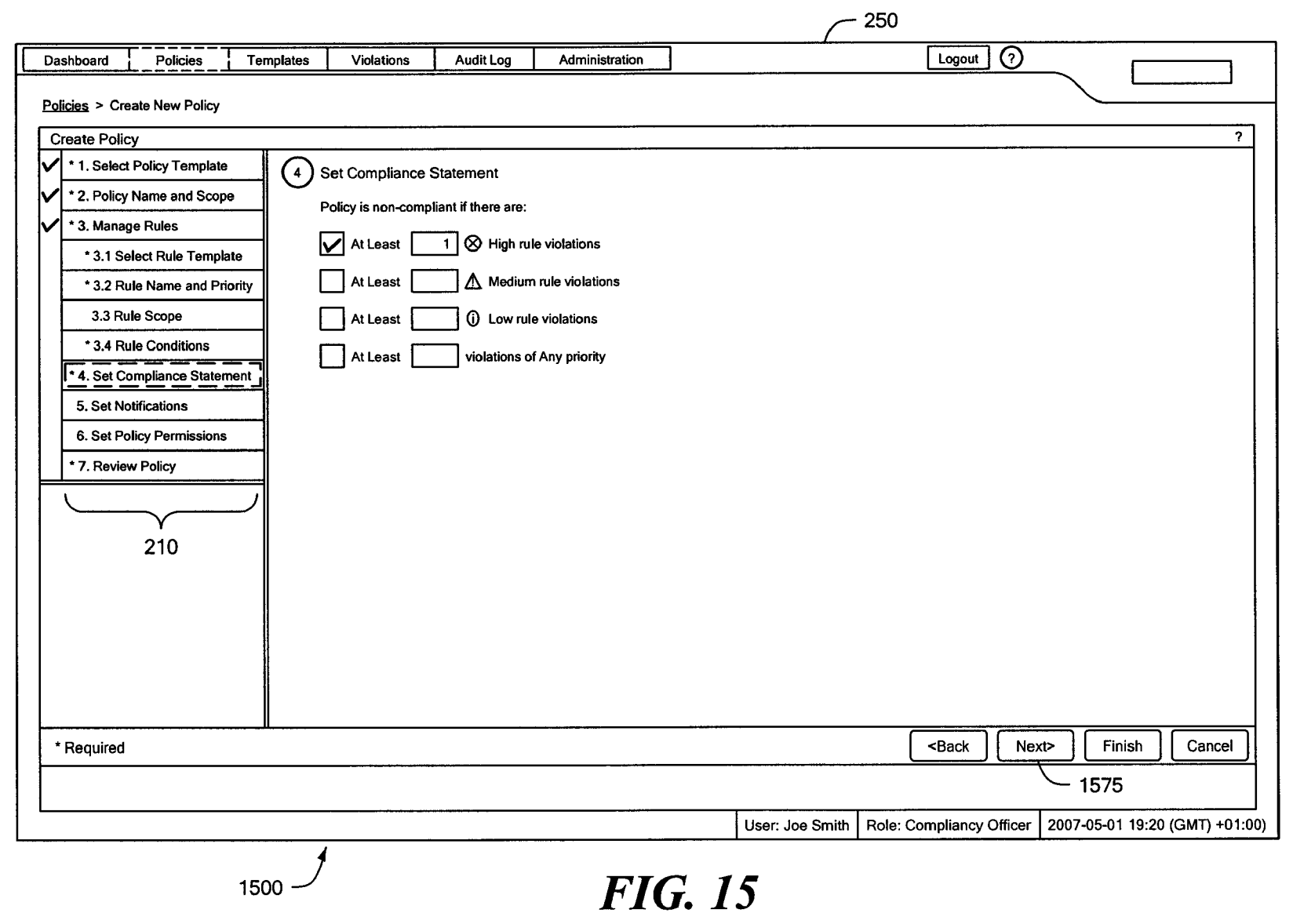

FIG. 15 is an example screenshot 1500 illustrating a graphical user interface enabling setting of a compliance statement according to embodiments herein. As shown, the user can select indicate how many different types of rule violations that must occur before indicating that the (newly created) compliance policy has failed as a result of rule violations associated with the compliance policy.

Figure 16:
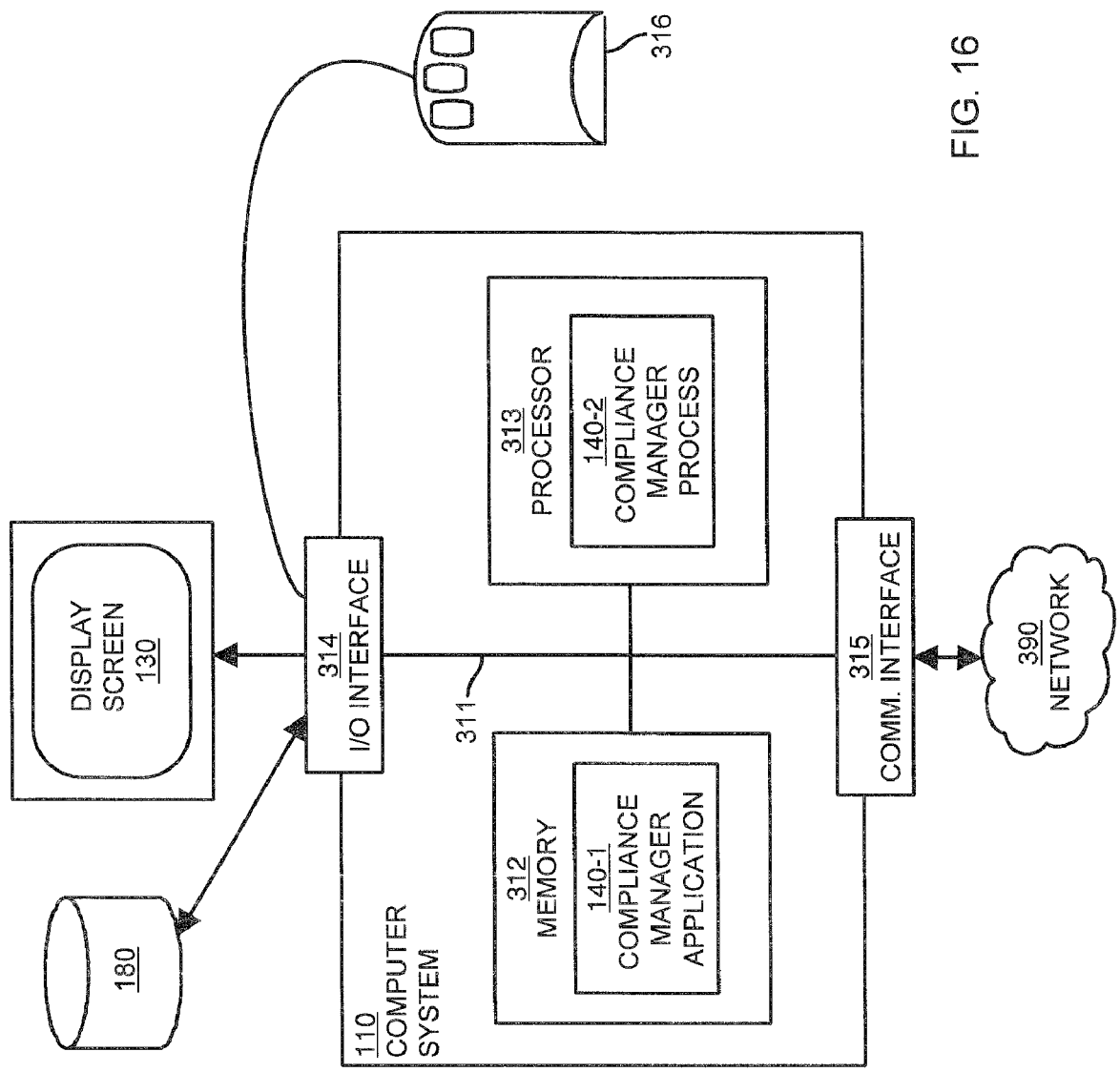
FIG. 16 is an example block diagram of a processing device suitable for executing a respective compliance manager according to embodiments herein.

FIG. 16 is a block diagram illustrating an example computer system 310 for executing compliance manager 140 and related functions/processes according to embodiments herein. Computer system 310 may be a computerized device such as a personal computer, workstation, portable computing device, console, network terminal, processing device, etc.

As shown, computer system 110 of the present example includes an interconnect 311 that couples a memory system 312, a processor 313, an I/O interface 314, and a communications interface 315. I/O interface 314 enables computer system 110 to access repository 180 and display a graphical user interface on display screen 130. Communications interface 315 of computer system 310 enables computer system 310 to communicate over network 390 to transmit and receive information from different resources.

As shown, memory system 312 is encoded with compliance manager application 140-1 supporting generation of graphical user interface and other functions according to embodiments herein. Compliance manager application 140-1 can be embodied as software code such as data and/or logic instructions (e.g., code stored in the memory or on another computer readable medium such as a disk) that support functionality according to different embodiments described herein.

During operation of compliance manager application 140-1, processor 313 accesses memory system 312 via the interconnect 311 in order to launch, run, execute, interpret or otherwise perform the logic instructions of the compliance manager application 140-1. Execution of the compliance manager application 140-1 produces processing functionality in compliance manager process 140-2. In other words, the compliance manager process 140-2 represents one or more portions of the compliance manager application 140-1 (or the entire application) performing within or upon the processor 313 in the computer system 310.

It should be noted that compliance manager process 140-2 (also in FIG. 1) executed in computer system 310 can be represented by either one or both of the compliance manager application 140-1 and/or the compliance manager process 140-2. For purposes of this discussion and different embodiments herein, general reference will again be made to the compliance manager process 140-2 as performing or supporting the various steps and functional operations as previously discussed and as will be discussed further in this specification.

As mentioned, in addition to the compliance manager process 140-2, embodiments herein include the compliance manager application 140-1 itself (i.e., the un-executed or non-performing logic instructions and/or data). The compliance manager application 140-1 may be stored on a computer readable medium such as a floppy disk, hard disk, or optical medium. The compliance manager application 140-1 may also be stored in a memory type system such as in firmware, read only memory (ROM), or, as in this example, as executable code within the memory system 312 (e.g., within Random Access Memory or RAM). In addition to these embodiments, it should also be noted that other embodiments herein include the execution of compliance manager application 140-1 in processor 313 as the compliance manager process 140-2. Thus, those skilled in the art will understand that the computer system 310 may include other processes and/or software and hardware components, such as an operating system that controls allocation and use of hardware resources.

Functionality supported by compliance manager 140 and other resources will now be discussed via flowcharts in FIG. 17-19.

Figure 17:
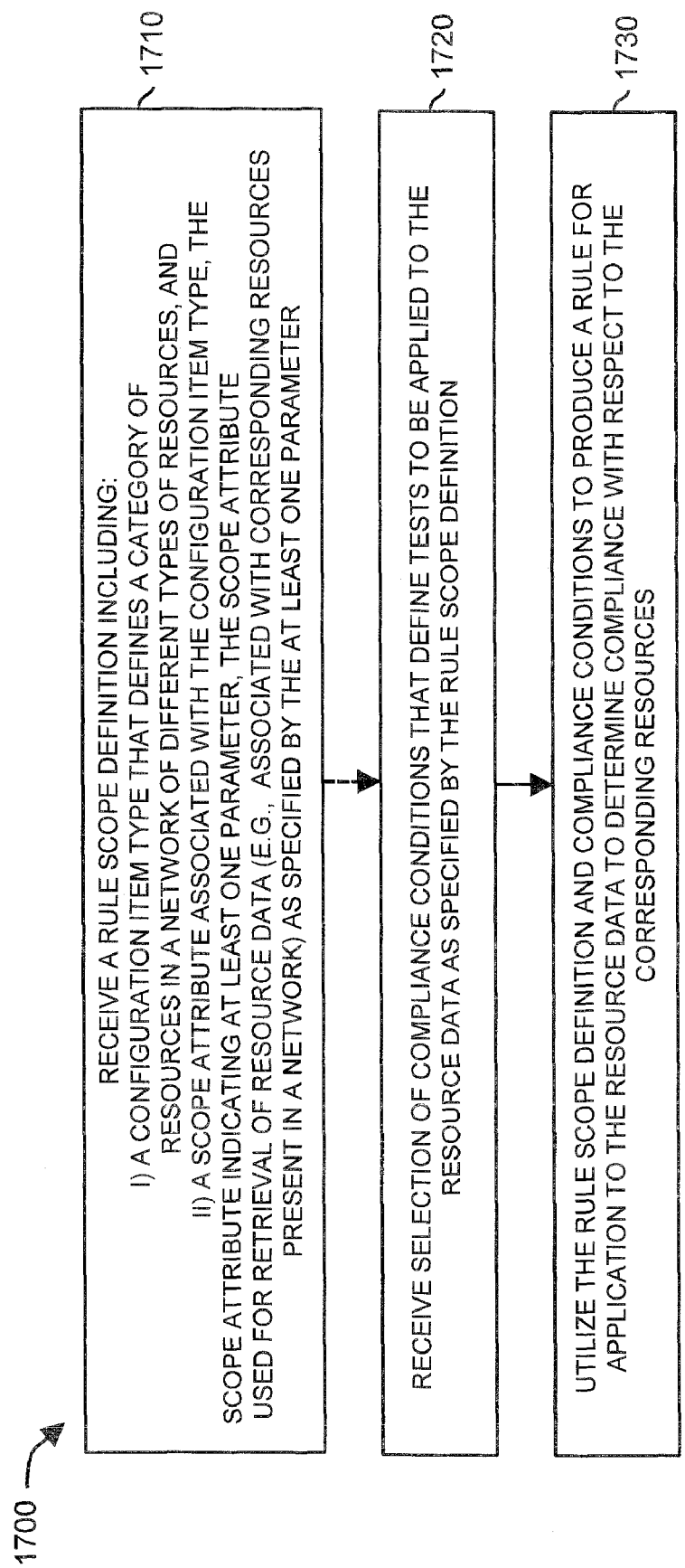
FIG. 17 is an example flowchart illustrating a technique associated with management of policies and/or rules according to embodiments herein.

Now, more particularly, FIG. 17 is a flowchart 1700 illustrating a technique of enabling management of compliance policies and corresponding rules according to embodiments herein. Note that techniques discussed in flowchart 1700 overlap with the techniques discussed above.

In step 1710, the compliance manager 140 receives a rule scope definition associated with a rule being created for a respective compliance policy. The rule scope definition includes: i) specification of a configuration item type (e.g., host, connection, services, etc.) that defines a category of resources in a network of different types of resources, and ii) one or more scope attributes associated with the configuration item type. The scope attribute indicates at least one parameter associated with the configuration item type that is used for retrieval of resource data (e.g., associated with corresponding resources present in a network) stored in repository 180.

In step 1720, the compliance manager 140 receives selection of compliance conditions that define tests to be applied to the resource data as specified by the rule scope definition.

In step 1730, the compliance manager 140 utilizes the rule scope definition and compliance conditions to produce a rule for application to the resource data to determine compliance with respect to the corresponding resources.

Figure 18:
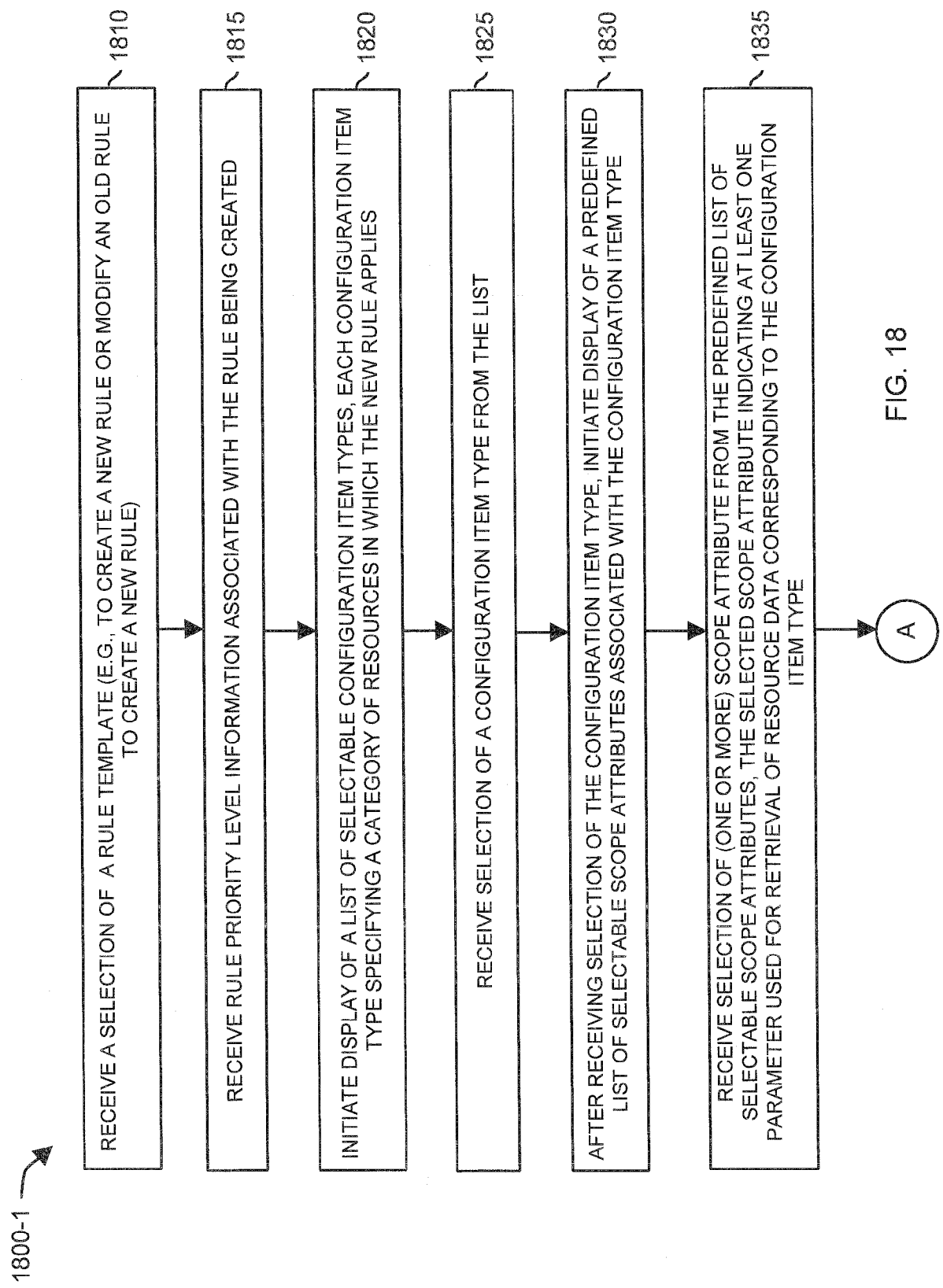
FIGS. 18, 19, and 20 combine to form an example flowchart illustrating a technique facilitating management of policies and corresponding rules according to embodiments herein.
Figure 19:
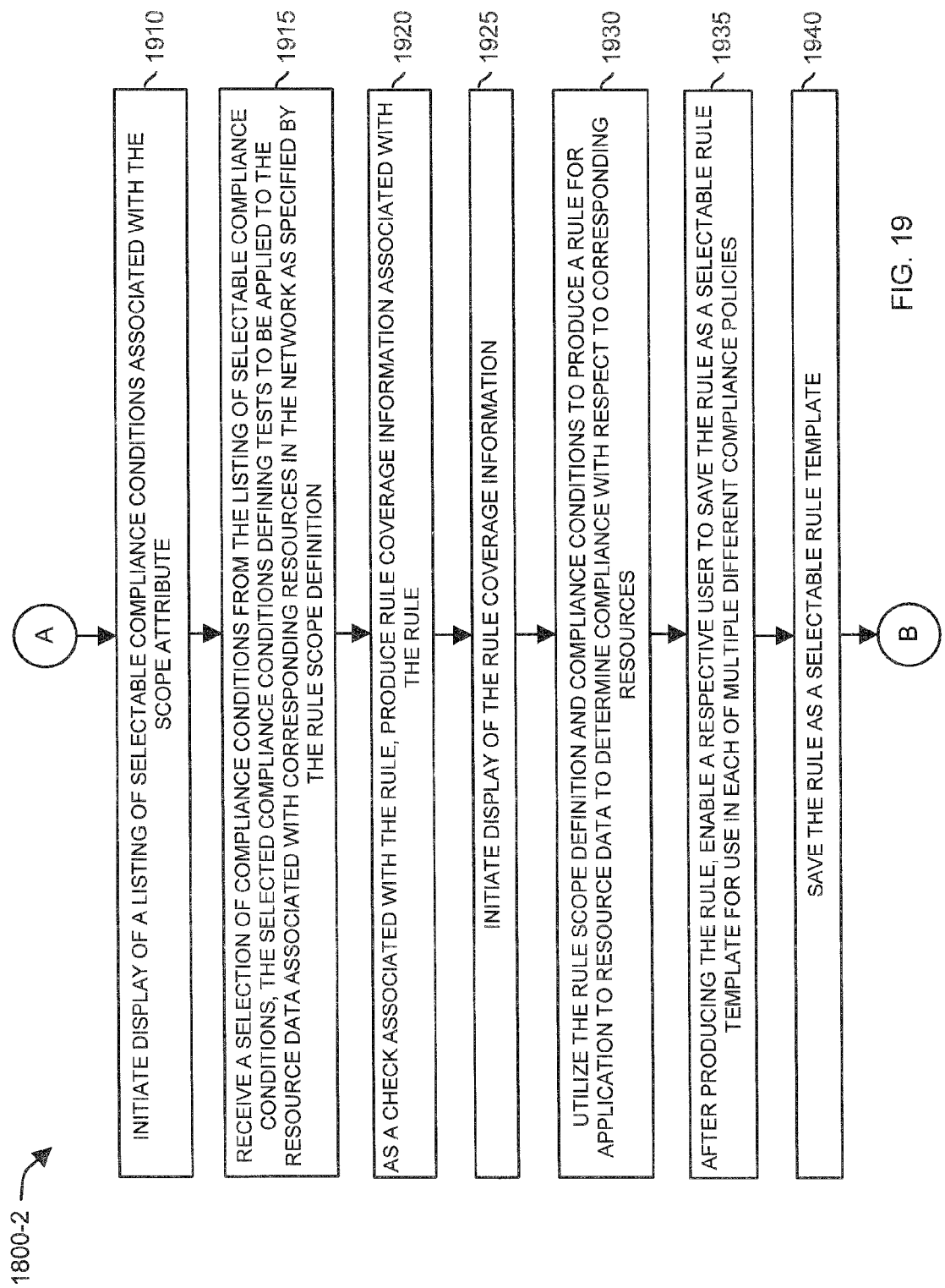
Figure 20:
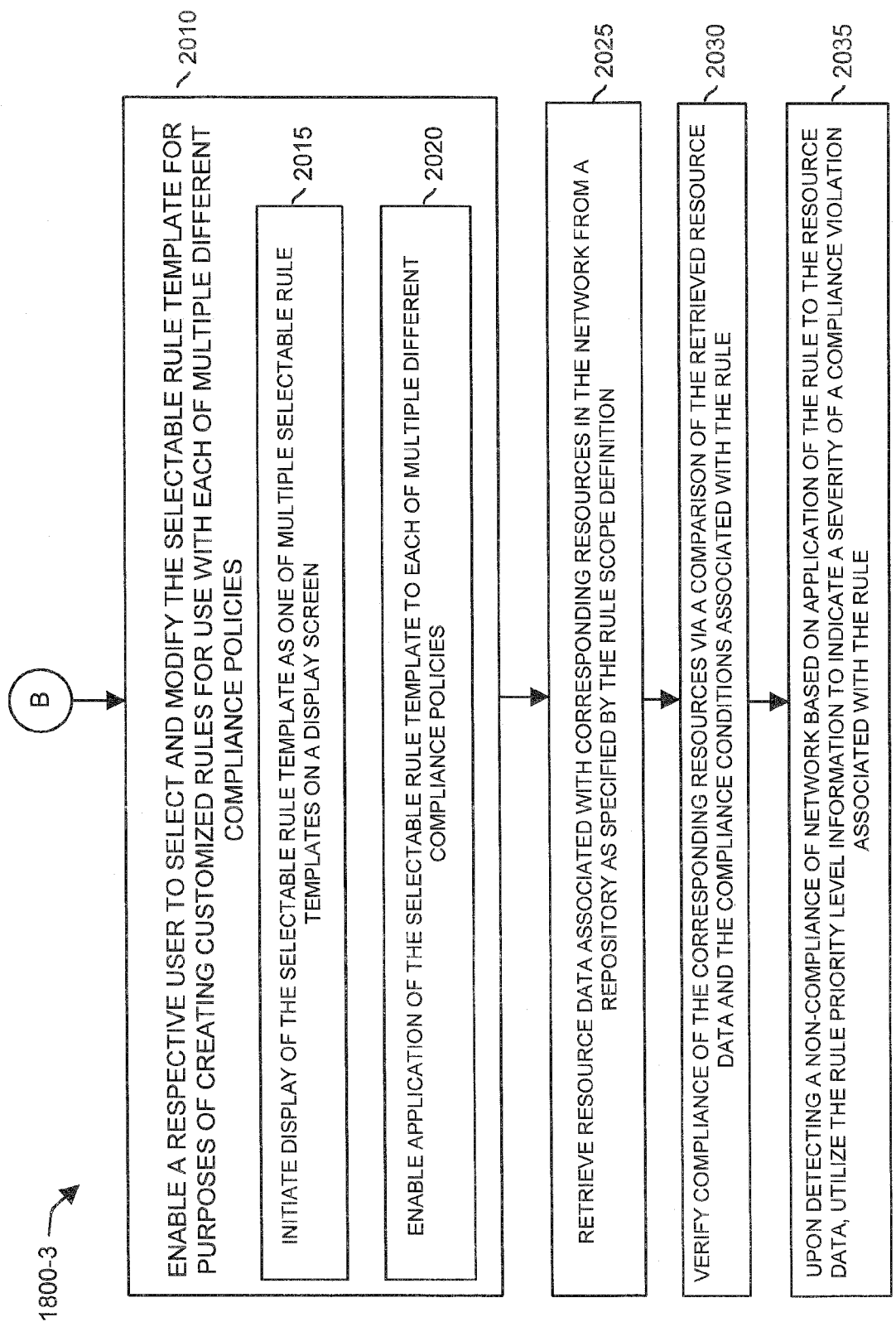

FIGS. 18-20 combine to form a detailed flowchart 1800 (e.g., flowchart 1800-1, flowchart 1800-2, and flowchart 1800-3) illustrating techniques for maintaining information associated with a respective storage area network environment according to an embodiment herein. Note that techniques discussed in flowchart 1800 overlap with the techniques discussed above in the previous figures.

In step 1810 of flowchart 1800-1, the compliance manager 140 receives selection of a rule template (e.g., a blank rule template or old rule).

In step 1815, the compliance manager 140 receives rule name and priority level information associated with the rule being created.

In step 1820, the compliance manager 140 initiates display of a list of selectable configuration item types (e.g., host, services, connections). Each configuration item type specifies a category of resources to which the new rule applies.

In step 1825, the compliance manager 140 receives selection of a configuration item type from the list.

In step 1830, after receiving selection of the configuration item type, the compliance manager 140 initiates display of a predefined list of selectable scope attributes associated with the selected configuration item type.

In step 1835, the compliance manager 140 receives selection of (one or more) scope attributes from the predefined list of selectable scope attributes. The selected scope attributes indicate at least one parameter used for filtering and retrieval of resource data from repository 180 corresponding to the configuration item type.

In step 1910 of flowchart 1800-2 in FIG. 19, the compliance manager 140 initiates display of a listing of selectable compliance conditions to apply in accordance with the configuration item type and scope attributes.

In step 1915, the compliance manager 140 receives a selection of compliance conditions from the listing of selectable compliance conditions. The selected compliance conditions define one or more tests to be applied to the resource data associated with corresponding resources in the network as specified by the rule scope definition.

In step 1920, as a check associated with the rule being created, the compliance manager 140 produces rule coverage information associated with the rule.

In step 1925, the compliance manager 140 initiates display of the rule coverage information to the respective user.

In step 1930, the compliance manager 140 utilizes the rule scope definition and compliance conditions to produce and store a rule for application to resource data to determine compliance with respect to corresponding resources.

In step 1935, after producing the rule, the compliance manager 140 enables a respective user to save the rule as a selectable rule template for use in each of multiple different compliance policies.

In step 1940, the compliance manager 140 saves the rule as a selectable rule template.

In step 2010 of flowchart 1800-2 in FIG. 20, the compliance manager 140 enables a respective user to select and modify the selectable rule template for purposes of creating customized rules for use with each of multiple different compliance policies.

In step 2015, the compliance manager 140 initiates display of the selectable rule template as one of multiple selectable rule templates.

In step 2020, the compliance manager 140 enables application of the selectable rule template to each of multiple different compliance policies.

In step 2025, during application of the compliance policy and corresponding rules with respect to resource data in repository 180, the compliance manager 140 retrieves resource data associated with corresponding resources in the network from a repository as specified by the rule scope definition of a rule being checked for compliancy.

In step 2030, the compliance manager 140 verifies compliance of the corresponding resources via a comparison of the retrieved resource data and the compliance conditions associated with the rule.

In step 1940, upon detecting a non-compliance of network based on application of the rule to the resource data, the compliance manager 140 utilizes the rule priority level information to indicate a severity of a compliance violation associated with the rule.

As discussed above, techniques herein are well suited for use in network environments in which rules are applied to test for compliancy. However, it should be noted that embodiments herein are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present application. As such, the foregoing description of embodiments of the present application is not intended to be limiting. Rather, any limitations to the invention are presented in the following claims.

What is claimed is:

1. A method for rule processing in a network compliance application, the method comprising:
   receiving a rule scope definition including:
   i) a configuration item type that defines a category of resources in a network of different types of resources;
   ii) a scope attribute of the configuration item type, the scope attribute indicating at least one parameter used for retrieval of resource data corresponding to the configuration item type;
   receiving selection of compliance conditions that define desired states to be applied to the resource data associated with corresponding resources in the network as specified by the rule scope definition; and
   utilizing the rule scope definition and compliance conditions to produce a rule for application to the resource data to determine compliance with respect to the corresponding resources.

2. A method as in claim 1 further comprising:
applying the rule to a repository of message data collected from multiple application resources communicating with each other over the network; and
based on a comparison of the compliance conditions to portions of the repository of message data as specified by the rule scope definition, identifying compliancy with respect to the communicating application resources.

3. A method as in claim 2, wherein applying the rule to the repository of message data includes applying the rule to a repository of message data collected by passively monitoring and collecting message information transmitted between the application resources; and
wherein identifying compliancy includes verifying whether attributes associated with the message information transmitted between the application resources indicates violation of the rule.

4. A method as in claim 1 further comprising:
applying the rule to a repository of data collected from multiple application resources in the network; and
based on application of the rule to the repository of data, identifying compliancy with respect to corresponding configurations of the application resources.

5. A method as in claim 1 further comprising:
enabling creation of the rule scope definition based on a first rule scope definition display option in which a respective user selects the scope attribute from a list of predefined scope attributes and the at least one parameter is selected from a list of multiple user selectable parameters associated with the scope attribute; and
enabling creation of the rule scope definition based on a second rule scope definition display option in which the respective user manually defines the scope attribute and at least one parameter.

6. A method as in claim 1, wherein the configuration item type is at least one of:
i) a host resource in the network,
ii) a connection resource between two or more resource applications communicating with each other in the network, and
iii) a service resource providing a respective service function in the network.

7. A method as in claim 1 further comprising:
after receiving selection of the configuration item type, initiating display of a predefined list of selectable scope attributes associated with the configuration item type;
receiving selection of the scope attribute from the predefined list of selectable scope attributes;
initiating display of a listing of selectable compliance conditions associated with the scope attribute; and
receiving the selection of the compliance conditions from an entry in the listing of selectable compliance conditions.

8. A method as in claim 1 further comprising:
associating the rule to a compliance policy having a corresponding compliance policy scope, the corresponding compliance policy scope specifying a scope of resources in the network to which the compliance policy applies; and
utilizing the compliance policy scope to identify a number of resources in the network having sufficient resource data to be evaluated for the rule scope definition.

9. A method as in claim 1 further comprising:
based on the rule scope definition, producing rule coverage information specifying a number of resources in the network to which the rule applies.

10. A method as in claim 1 further comprising:
based on input, associating the rule with a compliance policy, the compliance policy having an associated compliance policy scope to which the compliance policy applies; and
based on the compliance policy scope, producing compliance policy coverage information specifying a number of resources in the network to which the compliance policy applies.

11. A method as in claim 10 further comprising:
based on the rule scope definition, producing rule coverage information specifying a number of resources in the network to which the rule applies;
producing relative coverage information specifying resource coverage associated with the rule relative to resource coverage associated with the compliance policy coverage.

12. A method as in claim 10, wherein producing the relative rule coverage information includes:
identifying an amount of the resources in the network to which the compliance policy applies;
identifying a portion of the amount of resources in the network to which the rule applies; and
providing notification of at least one the portion of the amount of resources to which the rule applies and the amount of the resources in the network to which the compliance policy applies.

13. A method as in claim 1 further comprising:
after producing the rule, enabling a respective user to save the rule as a selectable rule template for use in each of multiple different compliance policies.

14. A method as in claim 10 further comprising:
initiating display of the selectable rule template as one of multiple selectable rule templates on a display screen; and
enabling application of the multiple selectable rule templates to each of multiple different compliance policies.

15. A method as in claim 10 further comprising:
saving the rule as a selectable rule template; and
enabling a respective user to select and modify the selectable rule template for purposes of creating a customized rule.

16. A method as in claim 1 further comprising:
initiating application of the rule to a repository of respective data by:
retrieving the resource data associated with corresponding resources in the network from a repository as specified by the rule scope definition; and
verifying compliance of the corresponding resources via a comparison of the resource data and the compliance conditions.

17. A method as in claim 1 further comprising:
receiving rule priority level information associated with the rule; and
upon detecting a non-compliance of network based on application of the rule to the resource data, utilizing the rule priority level information to indicate a severity of a compliance violation associated with the rule.

18. A computer system comprising:
a processor;
a memory unit that stores instructions associated with an application executed by the processor; and
an interconnect coupling the processor and the memory unit, enabling the computer system to execute the application and perform operations of:
receiving a rule scope definition including:
i) a configuration item type that defines a category of resources in a network of different types of resources;

ii) a scope attribute of the configuration item type, the scope attribute indicating at least one parameter used for retrieval of resource data corresponding to the configuration item type;

receiving selection of compliance conditions that define desired states to be applied to the resource data associated with corresponding resources in the network as specified by the rule scope definition; and utilizing the rule scope definition and compliance conditions to produce a rule for application to the resource data to determine compliance with respect to the corresponding resources.

19. A computer system as in claim 18 further supporting operations of:

applying the rule to a repository of message data collected from multiple application resources communicating with each other over the network; and based on a comparison of the compliance conditions to portions of the repository of message data as specified by the rule scope definition, identifying compliancy with respect to the communicating application resources.

20. Software encoded on one or more computer-readable storage media, when executed, the software operable to:

receive a rule scope definition including:
i) a configuration item type that defines a category of resources in a network of different types of resources;
ii) a scope attribute of the configuration item type, the scope attribute indicating at least one parameter used for retrieval of resource data corresponding to the configuration item type;

receive selection of compliance conditions that define desired states to be applied to the resource data associated with corresponding resources in the network as specified by the rule scope definition; and utilize the rule scope definition and compliance conditions to produce a rule for application to the resource data to determine compliance with respect to the corresponding resources.

* * * * *